United States Patent
McLeod

(10) Patent No.: US 10,733,291 B1
(45) Date of Patent: Aug. 4, 2020

(54) BI-DIRECTIONAL COMMUNICATION PROTOCOL BASED DEVICE SECURITY

(71) Applicant: Square, Inc., San Francisco, CA (US)

(72) Inventor: Cameron McLeod, Oakland, CA (US)

(73) Assignee: Square, Inc., San Francisco, CA (US)

(*) Notice: Subject to any disclaimer, the term of this patent is extended or adjusted under 35 U.S.C. 154(b) by 207 days.

(21) Appl. No.: 16/005,192

(22) Filed: Jun. 11, 2018

(51) Int. Cl.
| | |
|---|---|
| G06F 21/55 | (2013.01) |
| G06F 21/86 | (2013.01) |
| G06F 21/72 | (2013.01) |
| G06F 13/42 | (2006.01) |
| G06F 11/34 | (2006.01) |
| H04L 9/08 | (2006.01) |

(52) U.S. Cl.
CPC ........ *G06F 21/554* (2013.01); *G06F 11/3485* (2013.01); *G06F 13/4282* (2013.01); *G06F 21/72* (2013.01); *G06F 21/86* (2013.01); *H04L 9/0861* (2013.01); *H04L 2209/34* (2013.01)

(58) Field of Classification Search
None
See application file for complete search history.

(56) References Cited

U.S. PATENT DOCUMENTS

| | | | |
|---|---|---|---|
| 5,870,289 A | 2/1999 | Tokuda et al. | |
| 5,960,084 A | 9/1999 | Angelo | |
| 6,056,193 A | 5/2000 | McAuliffe et al. | |
| 6,786,420 B1 | 9/2004 | Silverbrook | |
| 7,124,170 B1 | 10/2006 | Sibert | |
| 7,343,496 B1 | 3/2008 | Hsiang et al. | |
| 7,533,276 B2 * | 5/2009 | Matsushima | G06F 21/14 |
| | | | 713/194 |
| 7,837,110 B1 | 11/2010 | Hess et al. | |
| 7,878,397 B2 | 2/2011 | Mirkazemi-Moud et al. | |
| 8,344,881 B1 | 1/2013 | Hays | |
| 8,499,173 B2 | 7/2013 | Caci | |
| 8,786,272 B2 | 7/2014 | Carapelli et al. | |
| 9,342,717 B2 | 5/2016 | Claessen | |
| 9,479,340 B1 * | 10/2016 | Miller | H04L 9/3268 |
| 9,575,840 B1 | 2/2017 | Spangler et al. | |
| 9,659,178 B1 | 5/2017 | Wade | |
| 9,665,870 B1 | 5/2017 | Rezayee et al. | |
| 9,778,711 B2 | 10/2017 | Chang | |

(Continued)

FOREIGN PATENT DOCUMENTS

| | | |
|---|---|---|
| EP | 2 031 537 A1 | 3/2009 |
| EP | 3 537 745 A1 | 9/2019 |

(Continued)

OTHER PUBLICATIONS

Non-Final Office Action dated Aug. 25, 2016, for U.S. Appl. No. 14/183,118, of Wade, J., filed Feb. 18, 2014.

(Continued)

*Primary Examiner* — Kambiz Zand
*Assistant Examiner* — Arezoo Sherkat
(74) *Attorney, Agent, or Firm* — Lee & Hayes, P.C.

(57) ABSTRACT

A device, such as a payment reader, may include one or more units capable of providing access to sensitive data. Such units may be connected to each other through tamper traces. A secure unit can send known keys or key-value pairs between the units using a multi-directional protocol. The keys or key-value pairs are then compared by the secure unit to monitor or detect a tamper event.

20 Claims, 6 Drawing Sheets

(56) References Cited

U.S. PATENT DOCUMENTS

| | | | |
|---|---|---|---|
| 9,799,180 | B1 | 10/2017 | Rezayee et al. |
| 9,892,293 | B1 | 2/2018 | Wade et al. |
| 10,127,409 | B1 | 11/2018 | Wade et al. |
| 10,255,603 | B1 | 4/2019 | Rezayee et al. |
| 10,282,552 | B1 | 5/2019 | Wade |
| 2004/0095830 | A1 | 5/2004 | Tanaka |
| 2006/0038011 | A1 | 2/2006 | Baker et al. |
| 2006/0155899 | A1 | 7/2006 | Knapp |
| 2008/0091605 | A1 | 4/2008 | Hughes et al. |
| 2008/0198653 | A1 | 8/2008 | Brederlow et al. |
| 2010/0017621 | A1* | 1/2010 | Crawford ............... G06F 21/72 |
| | | | 713/189 |
| 2010/0264211 | A1 | 10/2010 | Jain et al. |
| 2010/0327856 | A1 | 12/2010 | Lowy |
| 2011/0078034 | A1 | 3/2011 | Hayhow |
| 2011/0107136 | A1 | 5/2011 | Jonnagadla et al. |
| 2011/0307711 | A1 | 12/2011 | Novak et al. |
| 2012/0056635 | A1 | 3/2012 | Oomura |
| 2012/0201379 | A1 | 8/2012 | Fuchs et al. |
| 2012/0274351 | A1 | 11/2012 | Pedersen et al. |
| 2013/0044003 | A1 | 2/2013 | Eguro et al. |
| 2013/0086691 | A1 | 4/2013 | Fielder |
| 2013/0119974 | A1 | 5/2013 | Chamarti et al. |
| 2013/0140364 | A1 | 6/2013 | McJones et al. |
| 2013/0179351 | A1 | 7/2013 | Wallner |
| 2013/0254431 | A1 | 9/2013 | Kuroiwa et al. |
| 2013/0339739 | A1 | 12/2013 | Hueber et al. |
| 2014/0025960 | A1 | 1/2014 | McLean |
| 2014/0181534 | A1 | 6/2014 | Nowottnick |
| 2014/0297540 | A1 | 10/2014 | Swamy et al. |
| 2015/0097572 | A1 | 4/2015 | Wade et al. |
| 2015/0331767 | A1 | 11/2015 | Bringivijayaraghavan et al. |
| 2016/0029221 | A1 | 1/2016 | Suarez Garcia et al. |
| 2016/0117225 | A1 | 4/2016 | Yu et al. |
| 2016/0357963 | A1 | 12/2016 | Sherman |
| 2016/0359636 | A1* | 12/2016 | Kreft ....................... G06F 21/71 |
| 2017/0103378 | A1* | 4/2017 | Pan ..................... G06Q 20/3227 |
| 2017/0236125 | A1 | 8/2017 | Guise et al. |
| 2020/0065817 | A1 | 2/2020 | Guise et al. |

FOREIGN PATENT DOCUMENTS

| | | |
|---|---|---|
| WO | 2017/139633 A1 | 8/2017 |
| WO | 2018/111601 A1 | 6/2018 |

OTHER PUBLICATIONS

Non-Final Office Action dated Sep. 15, 2016, for U.S. Appl. No. 15/011,347, of Rezayee, A., et al., filed Jan. 29, 2016.
Notice of Allowance dated Jan. 20, 2017, for U.S. Appl. No. 14/183,118, of Wade, J., filed Feb. 18, 2014.
Notice of Allowance dated Jan. 26, 2017, for U.S. Appl. No. 15/011,347, of Rezayee, A., et al., filed Jan. 29, 2016.
Non-Final Office Action dated Apr. 3, 2017, for U.S. Appl. No. 15/382,165, of Wade, J., et al., filed Dec. 16, 2016.
Notice of Allowance dated Jun. 21, 2017, for U.S. Appl. No. 15/011,367, of Rezayee, A., et al., filed Jan. 29, 2016.
Notice of Allowance dated Sep. 19, 2017, for U.S. Appl. No. 15/382,165, of Wade, J., et al., filed Dec. 16, 2016.
Non-Final Office Action dated Jan. 11, 2018, for U.S. Appl. No. 15/382,122, of Wade, J., et al., filed Dec. 16, 2016.
Non-Final Office Action dated Apr. 18, 2018, for U.S. Appl. No. 15/043,233, of Guise, M., et al., filed Feb. 12, 2016.
Non-Final Office Action dated Jun. 5, 2018, for U.S. Appl. No. 15/693,456, of Rezayee, A., et al., filed Aug. 31, 2017.
Notice of Allowance dated Jul. 26, 2018, for U.S. Appl. No. 15/382,122, of Wade, J., et al., filed Dec. 16, 2016.
International Search Report and Written Opinion for International Application No. PCT/US2017/017453, dated Mar. 30, 2017.
International Search Report and Written Opinion for International Application No. PCT/US2017/064545, dated Feb. 28, 2018.
Extended European Search for European Patent Application No. 19171224.9, dated May 22, 2019.
Advisory Action dated Dec. 31, 2018, for U.S. Appl. No. 15/043,233, Guise, M., et al., filed Feb. 12, 2016.
Non-Final Office Action dated Feb. 7, 2019, for U.S. Appl. No. 15/043,233, of Guise, M., et al., filed Feb. 12, 2016.
Non-Final Office Action dated Oct. 3, 2018, for U.S. Appl. No. 15/476,324, of Wade, J., filed Mar. 31, 2017.
Final Office Action dated Oct. 19, 2018, for U.S. Appl. No. 15/043,233, of Guise, M., et al., filed Feb. 12, 2016.
Notice of Allowance dated Nov. 28, 2018, for U.S. Appl. No. 15/693,456, of Rezayee, A., et al., filed Aug. 31, 2017.
Notice of Allowance dated Dec. 12, 2018, for U.S. Appl. No. 15/476,324, of Wade, J., filed Mar. 31, 2017.
Notice of Allowance dated Jun. 27, 2019, for U.S. Appl. No. 15/043,233, of Guise, M., et al., filed Feb. 12, 2016.

* cited by examiner

BI-DIRECTIONAL COMMUNICATION PROTOCOL BASED DEVICE SECURITY

BACKGROUND

Electronic devices may perform operations involving critical information such as personally identifying information, account information, medical information, business information, or various other types of sensitive information that has economic or other value. Such devices may be ripe targets for hackers or other attackers who seek to access such critical information through eavesdropping or hacking devices. For example, an attacker may try to monitor signals that are transmitted to or received by devices, as well as signals that are internal to the devices. This may be done by non-invasive or invasive means. In many cases, attackers attempt to physically access components of the device, such as one or more communication lines carrying data or a processor that communicates and processes payment information. Attackers may also attempt to simulate an external device or internal components of the device under attack. Accordingly, device makers employ a variety of methods to encrypt and protect critical information, safely store cryptographic information, and to identify and prevent tamper attempts.

Such attacks are also prevalent in system-on-chips (SoCs) that may include one or more processor cores and/or other initiator devices communicating via one or more shared interconnects to various target devices (e.g., memory, storage, and/or peripheral devices). The shared interconnect-based architecture is inherently prone to malicious attacks against the control mechanisms that manage access to target devices by initiator devices communicatively coupled to the shared interconnect.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
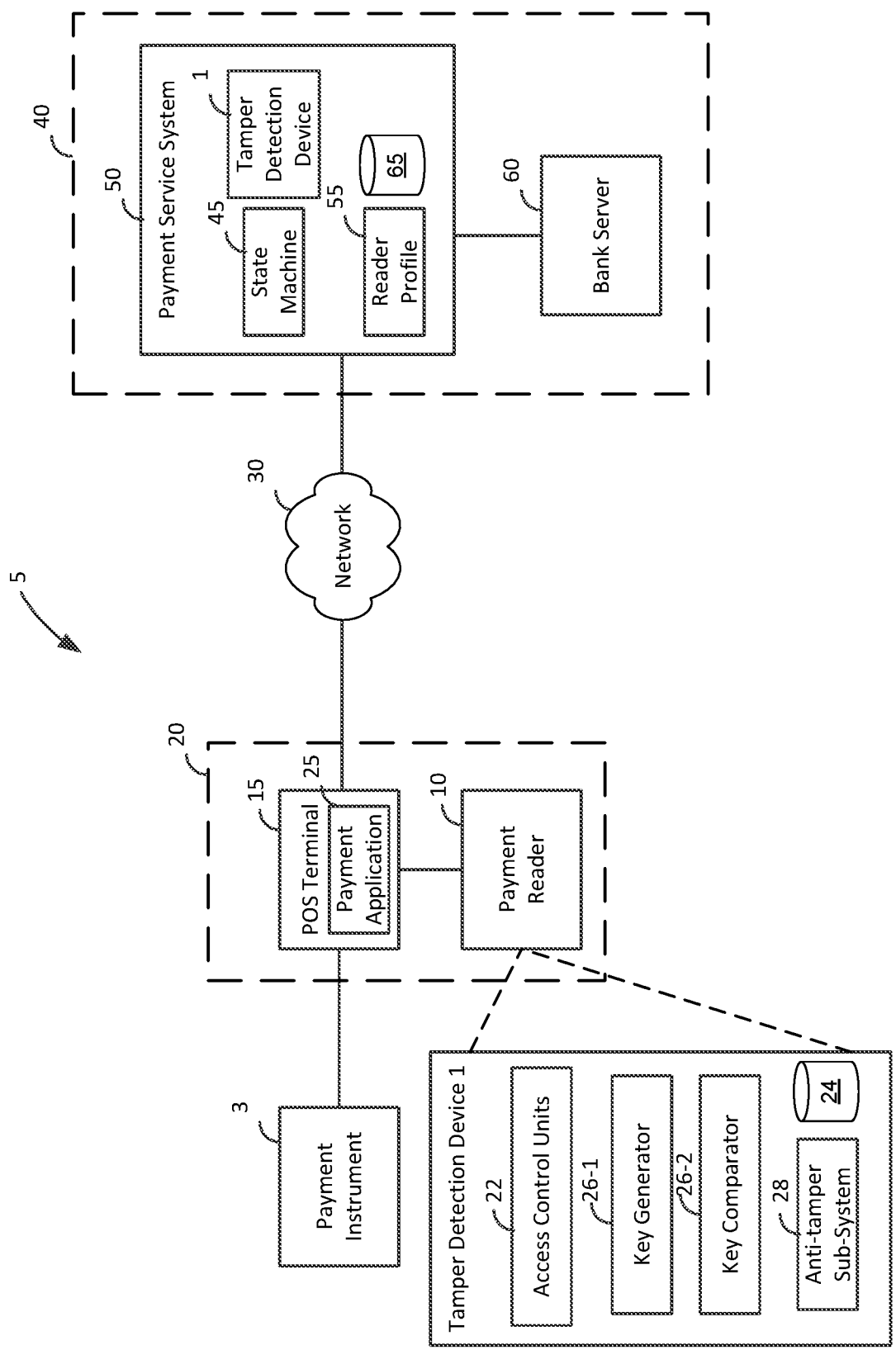
FIG. 1 is an illustrative block diagram of a payment system in a payment environment in accordance with some embodiments of the present disclosure.

Described herein are systems and methods for securing an electronic device and its operations or data from unauthorized or accidental attacks. Particularly, the systems and methods detect and prevent hardware and software attacks on the device.

The electronic device, such as a payment reader, may include cryptographic processing components and tamper protection devices to ensure security of the device and the data stored thereon. For example, cryptographic operations may be performed within a unique section of the device (e.g., physically and/or logically segregated) of the electronic device such that critical information is only provided to external devices or sections of the electronic device in encrypted form. The tamper protection devices may include a variety of physical and electrical components (e.g., tamper traces or lines, tamper meshes, tamper shields, temperature monitors, voltage monitors, clock monitors, tamper domes, tamper coatings, line-detection tamper devices, RF tamper detection components, etc.) to identify and prevent eavesdropping and tamper detection attempts on the electronic device, including attempts made on cryptographic processing components.

In some implementations, the electronic device or the tamper protection device may be an integrated circuit (IC), such as a systems-on-chip or programmable systems-on-chip, or even an external system, such as a tamper cage, that surrounds the device. The tamper detection device may include one or more processors and/or other devices communicating via one or more shared interconnects to various target devices (e.g., memory, storage, and/or peripheral devices). In certain implementations, the tamper detection device may further include an access control unit (e.g., a firewall) that may be configured to control access to various target devices based on pre-defined and/or run-time programmable access control data, such as a set of access control rules. The access control unit may be programmed by an on-chip or an external programming unit that may transmit messages including access control data items (e.g., access control rules).

As described herein, the methods and systems disclosed herein address various kinds of attacks. For example, in one kind of attack, the attacker will study the circuits of different metal levels of the integrated circuit in order to reconstitute the different parts of this circuit. To do this, the attacker has a number of rolling techniques (abrasive, chemical, electro-chemical, plasma etching, focused ion beam or FIB ("Focused Ion Beam")) allowing access to different levels of the circuit and observe them. Such a study can reveal the entire circuit structure.

Another type of attack called shorting is to establish or break contacts to spy signals within the component, and/or injecting test signals and observing the responses to these signals test. Contacts are made with either very fine electrodes (technique called shorting by micro-poll) to a precision of the order of 0.4 microns or by focused ion beam to an accuracy of the order of 10 nm, which in addition to allowing the micro-sample is used to modify the circuit. This type of attack allows access to sensitive information such as a secret key encryption or content of memories.

From the context of the programmable access control unit defined above, the attacks can focus on malicious modifications of the access control data stored by the access control unit, replaying previously sent programming messages, fault injection or glitching by disrupting execution of one or more instructions by an external disturbance, and/or various other methods.

In cases where the electronic device is a payment reader including EMV card, swipe card, or NFC payment capabilities, there are multiple opportunities for an attacker to attempt to obtain critical information, such as payment information or to otherwise engage in fraudulent transactions. For example, an attacker may attempt to intercept NFC communications, read data being communicated over the physical connections with the EMV card, or intercept that data from the magnetic stripe of a traditional swiping transaction. Moreover, signals carrying this and other critical information are transmitted within the payment reader and processed by processors and other circuitry of the payment reader.

Some of the attacks can be prevented by physical shields, like a metallic shield, which is a mesh of metal lines on the top-most layer of the IC. These shields, too, however, are known to have been penetrated by attackers to extract sensitive information without actual tampering, for example with the FIB tool. Digital or active shielding mitigates this problem by injecting random sequences of bits in the mesh, and subsequently checking whether they arrive unaltered after their journey.

To alleviate at least some of the problems identified above, in some embodiments, cryptographic and/or tamper operations may be performed in concert with an access control unit that controls what, when and how a tamper assembly, including conductive traces, tamper cage, tamper shield, and the like, should be enabled or disabled at any point in time, for example in response to a tamper event using the access control rules mentioned above.

In one embodiment, the tamper detection device includes a key generator, such as software or hardware based system, which generates a set of information, such as keys, nonces, one time pads, sequences, or addresses, which may be static or dynamic, and that randomly change over a period of time or for a session, to prevent deterministic prediction of a future state of the device based on past states or fraudulently obtained key information. The keys may either be related to each other or completely unrelated. Further, such key(s) may be generated based on hardware or software characteristics of the device, location, merchant, environment in which the device operates, time of the day, etc. The characteristics may be used to generate unique information, such as patterns of bits, which may be difficult to duplicate. One or more cryptographic units may be utilized for encryption, for example, as a source of key values, as seed values for encryption, or in other similar manners.

The keys can take the form of data signals, in one example. In one implementation, the keys can be sent over two different tamper traces of a tamper mesh. Further, a first key or data signal can be sent from a source to a destination over a first tamper trace; and a second key or data signal can travel from the destination to the source via the same tamper trace, i.e., the first trace, or over another trace, such as a second trace. In a broader implementation, data signals can be sent over multiple different paths from a source to a destination. The data signals travel in a single direction, i.e., from a source unit to a destination unit or a destination unit to a source unit over a specific path. The source unit and the destination unit then exchange the sent and received information to determine whether a trace may be exposed or subjected to a fraudulent attack. In another implementation, the source and the destination sent the information to a key comparator associated with the key generator, to determine whether the keys that were sent managed to travel without any alternation, generally caused due to a tamper attempt.

For this, the tamper detection device, including the source unit and the destination unit, may be configured to authenticate incoming data signals using a authentication function (e.g., a cryptographic hash function) that provides a digital signature to allow the hardware being reprogrammed to confirm the identity of the source of the signals. The authentication function can be implemented by a non-invertible function that allows decrypting, using a first key of a key pair, a message that has been encrypted using a second key of the key pair. Examples of authentication function include RSA cipher functions based on factorization of large prime numbers, cryptographic functions based on elliptic curves, and cryptographic hash functions. In certain implementations, an authentication function may be implemented by a cryptographic hash and one or more cryptographic keys shared between an authorized programming agent and a programmable hardware functional unit, as described in more details herein below.

In certain implementations, a tamper detection device may be further configured to validate the integrity of the access control data stored by the access control unit by associating a key with the data and comparing the key with the data during validation. In various examples, source units may be represented by on-chip or off-chip central processing units (CPUs), graphical processing units (GPU), cryptographic cores, etc. Similarly, destination units may be provided by on-chip or off-chip memory devices, storage devices, various input/output (I/O) devices, etc. The access control unit may be implemented by a memory management unit (MMU) configured to enforce access control based on the access control data while translating addresses from one address space into another address space (e.g., virtual addresses to physical addresses).

The systems and methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation.

As defined herein, a device tamper may include an activity that attempts to alter a pre-defined functionality of a device such as a payment reader, retrieve its protected information, or mimic its identity in a non-authorized way. For example, in a mechanical tamper, the device is opened to expose the critical signals and monitor the information that is transferred using those signals. An electronic chip-level tamper can expose the critical content of the memory to reveal the secret keys preserved in that memory.

As defined herein, a tamper mesh may include multiple traces that are parallel with each other and input/output ports positioned at a regular or variable spacing. The mesh may, alternatively, include traces that are entangled, criss-crossed, or otherwise intricately routed. Accordingly, the IC can include a single or multiple metal layers to incorporate a parallel or intricate mesh routing.

Advantages of the methods and systems disclosed herein include prevention from FIB attacks as the wires carry different information and neither the source nor the destination have full visibility into which pair of traces are carrying the key pairs. Further, since the keys pairs change dynamically, the data and the relationship between the data is unpredictable. Further, implementing the device protection system disclosed herein may alleviate the need to store a single secret key in any physical memory, on-chip or off-chip, since the keys change dynamically. Furthermore, the timing of when the data is sent on the traces and in what specific format is also known only to the specific units entrusted with such information.

Another advantage is that the technology herein increases the security rating of the device in which it is implemented.

Generally, security audit companies rate devices, such as those that are vulnerable to security vulnerabilities and accordingly, prone to financial losses, a security score based on the companies' attempt to attack the device, the time it takes to attack the device, the expertise required to attack, and so on. Any incremental gains are useful in bringing the score up and raise the standards of the device, but the gains have to maintained with a fine balance as the device should fail when intended, but not fail when the customer is abusive with the product. Any aggressive tamper measures can cause accidental triggering of tamper protection. However, as disclosed herein, the measures ensure that the tampering and spoofing is prevented while false tampering continues to be detected, for example by leveraging technologies, such as I2C transmission protocols, for transmission of data for tamper/spoof detection, which perform dual function, i.e., that of transmitting information while checking for tamper events and spoofing. Some prior implementations have utilized unidirectional tamper detection in tamper shields, however, in such implementations, the information is easy to be spoofed.

In yet another implementation, the technology herein reduces programming and designing overheads as the data that is sent over transmission lines, such as tamper traces, need not be encrypted. Because the keys are generated as random pairs with only the generator knowing the key-value pairs, the keys need not be encrypted. Similarly, for one-time pads which are a cryptographic operation where set of keys are given to a subordinate and the value is pulled from a blob based on key input. In one implementation, the key can be a challenge question and The method of claim 5, the information sent is a challenge question and the information detected is a response to the challenge question, wherein both the challenge question and acceptable responses to the challenge question are generated and/or stored by the secure unit. The key itself does not need to be obscured since the blob can be generated dynamically ensuring that even for repeat key sequences, the appropriate response will always be different. Allowing unencrypted data to travel on transmission lines removes the need to deploy specific cryptographic mechanisms for protection of data.

Various embodiments and implementations of the disclosed technology are now described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Unless specifically stated, terms such as "updating," "identifying," "determining," "sending," "assigning," or the like, refer to actions and processes performed or implemented by computing devices that manipulates and transforms data represented as physical (electronic) quantities within the computing device's registers and memories into other data similarly represented as physical (electronic) quantities within the computing device's registers and memories or other such information storage, transmission or display devices.

The technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions. Various embodiments will now be described in further detail with the help of one or more figures.

The preceding summary is provided for the purposes of summarizing some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 depicts an illustrative block diagram of an example tamper detection device 1 to be implemented, for example in a payment environment 5 or within a payment system 20, in accordance with some embodiments of the present disclosure. In one embodiment, payment system 5 includes a payment instrument 3, payment device 10, payment terminal 20, network 30, and payment server 40. Although the tamper detection device 1 of the present disclosure may be implemented in a variety of devices, in an exemplary embodiment described herein the device may be a payment terminal (e.g., a payment reader of a payment terminal). In an exemplary embodiment, payment server 40 may include a plurality of servers operated by different entities, such as a payment service system 50 and a bank server 60. These components of payment system 1 facilitate electronic payment transactions between a merchant and a customer. In another embodiment, the payment system 1 may facilitate transactions between any two parties, such as a sender and recipient, in a peer-to-peer transfer scenario.

The electronic interactions between the merchant and the customer take place between the customer's payment device 10 and the merchant's payment terminal 20. The customer has a payment instrument 3, such as a credit card having magnetic stripe, a credit card having an EMV chip, or an NFC-enabled electronic device such as a smart phone running a payment application. The merchant has a payment system 20 such as a POS terminal 15 or other electronic payment device (such as a card reader 10) that is capable of processing payment information (e.g., encrypted payment card data and user authentication data) and transaction information (e.g., purchase amount and point-of-purchase information), such as a smart phone or tablet running a payment application 25.

In some embodiments (e.g., for low-value transactions or for payment transactions that are less than a payment limit indicated by an NFC or EMV payment device 3), the initial processing and approval of the payment transaction may be processed at POS terminal 15. In other embodiments, payment system 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment system 20 and the payment server 40 communicate payment and transaction information to determine whether the transaction is authorized. For example, payment system 20 may provide encrypted payment data, user authentication data, purchase amount information, and point-of-purchase information to payment server 40 over network. Some of the units referred to above communicate via one or more shared interconnects. The shared interconnect-based architecture is inherently prone to malicious attacks against the anti-tamper mechanism in place allowing access to data to otherwise inaccessible or sensitive data. To this end, in one implementation, the information or messages traveling over such interconnects or traces can be authenticated by supplying known information on pairs of interconnects to see if the information travels unchanged in both the directions. Instead of two directions, an arbitrary number of interconnects or directions can be chosen. In one implementation, the interconnects can be part of the tamper detection device described below. However, in another implementation, the interconnects can be any part of the device, for example a silicon-on-chip or network-on-chip.

The payment system 20 may be associated with a tamper detection device 1. The tamper detection device 1 can sense attempts to gain improper physical access to the electronic device (e.g., by opening the payment reader or drilling into the payment reader to access signals or components), attempts to physically provide electrical signals to the payment reader (e.g., attempts to inject malicious signals into externally accessible pins of the payment reader, such as EMV pins), and attempts to wirelessly introduce malicious signals to the payment reader, for example. Some tamper detection devices may generate a response such as opening a circuit in response to tamper attempt. However, the attackers can detect such tamper response behavior and change the tamper attacks to bypass the responses. To this end, the tamper detection device 1 includes one or more access control units 22 having or associated with: a database 24 securely storing (a) data that is sensitive and critical to the tamper detection device 1; and (b) specific key generation rules; and a key generator 26-1 that generates cryptographic keys, nonces, or one-time pads for the purposes of tamper verification and detection and to generate or send information internally, for example on same or different paths. Keys can also be used to refer to key-value pairs, which can be a key and a data blob, for example a hex value table, to the entities chosen, for example a primary and secondary unit. The primary unit sends the key and the secondary unit replies with a value pulled from a non-reused look-up table. The key generator 26-1 can implement a cryptographically secure pseudo-random number generator (CSPRNG) or cryptographic pseudo-random number generator (CPRNG) for generation of keys, nonces, one-time pads (OTPs), and salts, etc., using schemes, such as ECDSA, RSASSA-PSS, etc. The one-time pad (OTP) is an encryption technique that implements the use of a one-time pre-shared key the same size as, or longer than, the message being sent. A plaintext can be paired with the OTP. Then, each bit or character of the plaintext may be encrypted by combining it with the corresponding bit or character from the OTP using modular addition. In some implementations, the random part is kept unencrypted and even then, the random strings ciphertext is almost impossible to decipher with brute force being the only clue into cipher text.

The keys generated by generator 26-1 may be encrypted using cryptographic methods, such as block ciphers or stream ciphers, but do not need to as only the generator is aware of the keys. A key comparator 26-2 (implemented, for example, using flip flops, latches, logic gates, and/or operational amplifiers, etc.) can compare to see whether the information that is sent on specific paths is received unchanged or substantially unchanged, i.e., within a threshold range of acceptable values. In one implementation, the primary unit sending the key can verify the value received from the secondary unit. In another implementation, the secondary unit can receive keys from the tamper traces and reply directly to the comparator, or the generator, without response to the primary unit. These schemes can be implemented both intra or inter chip.

While the description herein may provide explanation of embodiments with reference to device 10, it will be understood that at least one or all components of the tamper detection device 1 may be positioned within or in association with the POS terminal 15, the payment server 40, or even as a standalone unit. Furthermore, parts of the tamper detection device 1 may be distributed across various elements of the payment environment.

In some implementations, the tamper detection device 1 includes anti-tamper sub-system 28 comprising a conductive shield or mesh, for example affixed on an IC housing the access control units 22, or onto one or more interior surfaces of the outer housing of the device 1 or even device 10. The conductive mesh can cover substantially all of the interior surfaces of the housing, or it may cover only one or more selected interior surfaces, or only certain portions of one or more interior surfaces (e.g., depending on the physical design of the device and the expected likelihood that a given surface will be targeted by a tampering attempt).

A "mesh" in this context refers to one or more conductive (e.g., metal) traces that are coupled to one or more detectors within the electronic device, and which may be but are not necessarily electrically coupled to each other. In this regard the term "trace" is used herein to refer to any form of conductive path. The traces may be disposed in serial, parallel, in a zigzag, curving, or a random pattern. The pattern can be varied from one unit of the device to the next during the manufacturing process, to make the traces' locations less predictable and thereby make circumvention of the mesh more difficult. The conductive mesh can be electrically coupled to a detector on a circuit board within the electronic device 1 by any known or convenient electrical connection technique. The detector(s) can detect either an open-circuit or short-circuit condition (or both) that results from an unauthorized attempt to open the housing/penetrating the traces, and output a signal in response, to trigger an appropriate tampering countermeasure. However, some modifications of the mesh can remain undetected, if they are small or surgically accurate enough to keep the mesh capacitance within acceptable bounds.

To counter at least such attacks on "passive" shields, methods and systems for a digital or active shielding are described herein. In one implementation, the tamper detection device 1 introduces a set of keys or OTPs (described above) or random sequence of bits from an initiator block to a target block connected via tamper traces, and another set of keys in the opposite direction, from the target block to the initiator block. The target and the initiator blocks may be within the access control units 22 and as such may be responsible for securing information, such as payment data or PII, pertaining to the reader, merchant, payment transactions, and the like. The embodiments may implement a multidirectional communication protocol, such an inter-integrated communication (I²C) protocol, UART protocol, CAN protocol, modified SPI protocol and any such 2-wire or multi-wire protocol, to send and receive data on a set of entities within the access control units or other secure units. The key comparator 26-2 checks that the correct value was returned for the generated information from both the initiator and target blocks. That is, the key comparator 26-2 determines that the information that was sent along a path was accurately received at the other end and in both the directions.

The methods and systems herein can detect suspicious activity, such as a rerouting attack by FIB, since the attacker may either send predictable data, such as matching the data on a comparable trace, or accidentally change the data slightly but enough during the prying, to be detected by the comparator 26-2. In some implementations, the tamper detection device 1 can make such determinations based on tamper rules stored within the database 24 of the tamper detection device 1. For example, the rules can define how much of a variation to expect in received signals, or which units should be paired for tamper detection, and so on. Further such rules may be based on predetermined or historical information about one or more tamper events, which may be established based on an initialization process as described herein, or dynamically modified as new rules are learned by the payment device 20 or server 40 via successful or unsuccessful tamper events either with this specific network or with other networks and/or other payment devices associated with the server 40 or bank server 60. The server 60, if storing the rules in the database 65 based on interaction with its network of devices, may be sent to the payment reader 10 at predefined time intervals or anytime a connection is established between the payment reader 10 and the payment server 40. Further, the server 40 can either customize rules for the reader, or send a subset of the stored rules to the reader based on its behavior, time of the day, proximate devices, and so on. Using machine-learning models, the implementations can dynamically or statically generate a customized rule set for a specific combination of primary or secondary units, which when executed detect a tamper event or validate whether the tamper trace is untampered. The rule set can determine which combination of primary unit and secondary unit to track, which specific traces to use, what kind of key-value pairs to transmit over traces, and so on.

In some implementations, the key comparator 26-2, or alternatively the tamper detection device 1, can be within the payment server 40, which may determine whether the payment device 10 is tampered with based on analysis of the information from the initiator and target blocks after the information is sent and received in conjunction with information relating to customer or merchant accounts, and responds to payment terminal 20 over network 30 to indicate whether or not the payment device is tampered or otherwise vulnerable to attacks. The key comparator 28 may be implemented as a state machine 45 that tracks the state of the reader in context of the information on its traces. The state machine 45, in one implementation, stores the states of the reader or readers 5 associated with a merchant account or payment application 25 in a database 65, as a data structure hereinafter referred to as reader profile 55. The reader profile 55 corresponds to the identity of the reader 5, such as in terms of registration number of the reader 5, unique identifier, association of the reader 5 with a payment or merchant account, the association of the reader 5 with a mobile or POS terminal on which a payment application is executing and so on. When an attacker or other user attempts to acquire payment information by monitoring transmissions or gaining access to components of payment system 1 to eavesdrop on payment and transaction information or to inject malicious signals, such an activity is bound to change state of the reader, or the state of the traces and data transmitting thereon. Accordingly, the change of state can indicate a security vulnerability.

Based on the information that is received at payment terminal 20 and/or payment server 40, and the analysis conducted thereafter, the merchant may be indicated whether the device is tampered with and/or vulnerable to attacks, or whether the device is authorized to take/continue to take payments. In some embodiments such as a chip card payment device, a tamper event alert indicating inability to take payments may be indicated at the payment terminal, for example, at a screen of a payment terminal. In other embodiments, such as a smart phone or watch operating as an NFC payment device, information about the rejected or halted transaction and additional information (e.g., tamper alerts, remedial actions, etc.) may be provided to the NFC payment device for display at a screen of the smart phone or watch or storage in memory.

The devices of payment system 1 may have a combination of suitable hardware and software to utilize one or more access control units to generate information, such as cryptographic keys and transmit over traces or other tamper units to detect whether the same information is received on the other end. In one implementation, the exchange of information is bi-directional and occurs in pairs. The keys that are generated are not stored in memory which prevents an attacker to obtain useful physical access to ID and/or key information. Multiple cryptographic rules may be utilized together to create keys and IDs, and different keys and IDs may be utilized in a variety of situations. Payment server 40 may have hardware and software that facilitates the monitoring of the tamper hardware and access control units and may provide corrective action or provide instructions to modify the manner of operation of the payment terminal 20 and any suitable component thereof. In some embodiments, the payment server 40 may provide firmware that modifies the operation of the payment terminal 20 and access control units 22, for example, by utilizing different subsets of keys from the access control units for different operations, modifying error correction thresholds, and changing encryption levels for different operations and communications of the payment terminal 20.

Although it will be understood that the payment device 10 may be implemented in any suitable manner, for example as a payment reader. However, it will be understood that as used herein, the tamper detection device as described herein can be implemented in any kind of device implementing a shield or measure to detect and prevent hardware attacks. In an embodiment, the payment reader 10 of payment terminal 20 may be a wireless communication device that facilitates transactions between the payment device 10 and a merchant device 15 running a point-of-sale application 25.

Figure 2:
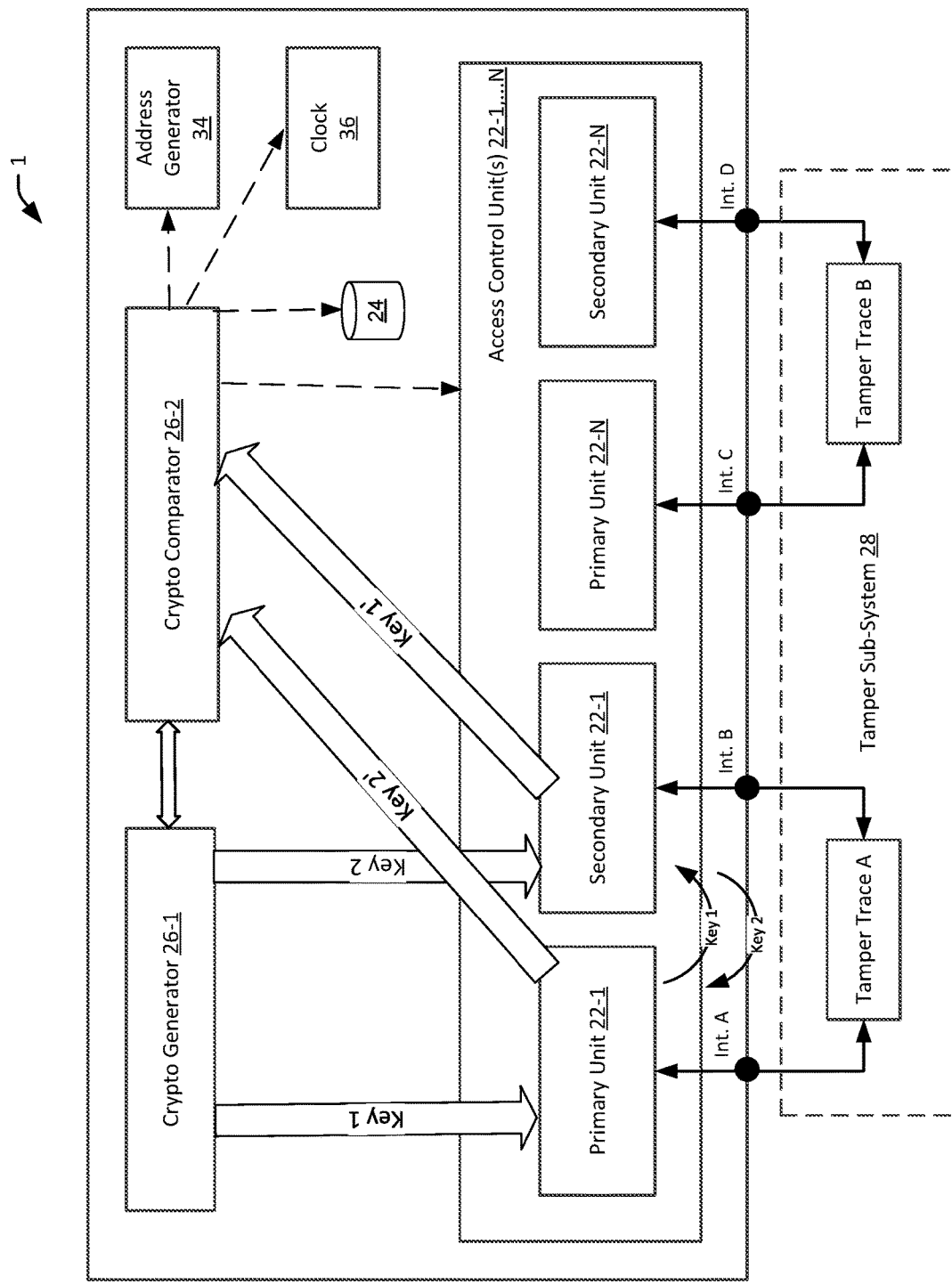
FIG. 2 is an illustrative schematic diagram of a tamper detection device in accordance with some embodiments of the present disclosure.

FIG. 2 depicts a block diagram of an exemplary tamper detection device 1 in accordance with some embodiments of the present disclosure. According to one embodiment, the tamper detection device 1 prevents and/or detects a tamper event to a secure device, such as a payment reader 5 described in FIG. 1, and may also prevent spoofing of signals or data between secure units within a secure device. The secure units, also referred to as access control units 22-1, . . . N (collectively referred to as secure units 22) may be configured to at least one of: (a) store data securely; (b) create rules for the the manner and protocols in which to store data; and (c) control (e.g., allow or disallow) access to various target devices or resources (including data) based on pre-defined and/or run-time programmable access control data (e.g., a set of access control rules). The secure units 22 may be programmed by an on-chip or an external programming agent that may transmit messages comprising access control data items (e.g., access control rules). The access control unit 22 may become a target of various attacks involving malicious modifications of the access control data stored by the access control unit, fault injection or glitching by disrupting execution of one or more instructions by an external disturbance, and/or various other methods. As such, in some implementations, the secure units 22 may be part of an SoC or NoC and may include firewalls to control the access.

Further, the secure units 22 within the device can be described in the form of master/slave units or blocks, transmitter/receiver blocks, primary/secondary blocks, first/second blocks, initiator/target blocks, etc., where the access control data may be within a single block or distributed between several of these blocks. The figure refers to such units as primary unit and secondary unit, which are connected to each other via a conductive path, such as a tamper trace. The primary and secondary units are associated with addresses generated by an address generator 34. These addresses may be static or dynamic, changed based on various factors, such as time of the day, keys being sent, combination of primary and secondary units, and so on. The changing addresses, in one implementation, identify the location of information or access data at any point in time. The access to the data resiging in such units can then be obtained through such addresses. So, the data can be protected by ensuring the keys are not spoofed and/or copied and addresses are changing dynamically. The addresses can be changed at the same clock signal at which the device operates or at a different clock signal. For example, in one implementation, the address changes on a rising/positive clock edge of the clock signal, while the address is assigned on a negative edge. In another implementation, the address is assigned on a rising/positive clock edge of the clock signal, while the address changes on a negative edge. In yet another implementation, the address is assigned asynchronously by or using a random number generator. In another implementation, the address is assigned asynchronously by or using a random number generator.

While some implementations describe a scenario where address and clock signals are synchronous to each other that means that the address may change in response to or after a certain event has passed, for example a tamper event has been detected. In some implementations, the address and clock signals can either be asynchronous or even plesiochrounous. Thus, the address changes may be asynchrnonous with respect to the clock signals, which means that the address changes at random time intervals or predefined time intervals irrespective of whether a tamper event or clock signal has changed.

In one example, the primary unit 22-1 and secondary unit 22-1 form a pair connected through a tamper trace A via interface A of the primary unit 22-1 and interface B of the secondary unit 22-1, while the primary unit 22-N and secondary unit 22-N form another pair connected through tamper trace B via interface C of the primary unit 22-N and tamper trace D of the secondary unit 22-N. In some implementations, multiple units can be connected via a single tamper trace, such that the primary units 22-1, . . . N are connected to secondary units 22-1, . . . , N via trace A. Alternatively, multiple units can be connected to multiple traces, such that the primary units 22-1, . . . N are connected to secondary units 22-1, . . . N via traces A and B. The tamper traces A, B, etc., may be part of the anti-tamper sub-system 28. The anti-tamper sub-system may also include tamper meshes and tamper switches. For example, if an attacker attempts to remove the cover of the payment terminal, a tamper switch may open. A tamper mesh may include conductive traces, such as trace A and B, that effectively covers sensitive components such as the processor or other circuitry of the payment terminal. If an attacker attempts to access the sensitive components (e.g., by drilling a small hole into the payment terminal), the conductive trace may be broken, resulting in an open circuit. The open circuit of the tamper switch or tamper mesh may be sensed by circuitry of the payment terminal, which may shut off the payment terminal or take other corrective action. As discussed before, an attacker may obtain secure information without penetrating the tamper mesh or otherwise disabling the tamper mesh. In those cases, the attacker is more likely to eavesdrop information off of the tamper traces or other data lines, or signals (passive attack), and/or modify or spoof payment processing communications (active attack) by injecting malicious signals into the device.

In one embodiment, the tamper detection device includes a crypto generator 26-1, such as software or hardware based system, which generates a set of keys or addresses, shown as key 1 and key 2, which may be static or dynamic, and that randomly change over a period of time or for a session, to prevent deterministic prediction of a future state of the device based on past states or fraudulently obtained key information. The keys may either be related to each other or completely unrelated, i.e., the key 1 and key 2 may have some relationship, such as that of equivalence so key 1 may be equal to key 2, or the key 1 may be a factor of key 2. Alternatively, key 1 and key 2 may be generated by a random number generator. Further, such key(s) may be generated based on hardware or software characteristics of the device, location, merchant, environment in which the device operates, time of the day, etc. The characteristics may be used to generate unique information, such as patterns of bits, which may be difficult to duplicate. One or more cryptographic units may be utilized for encryption, for example, as a source of key values, as seed values for encryption, or in other similar manners. In one implementation, a dedicated software or hardware or combinational system creates, stores, or generates the keys, which may be random and may be delivered through a dedicated bus or through a register tha is written once and then cannot be written until it is reset so that a fraudulent attacker cannot reset the keys. Further, the keys can be used for a single session following a session reboot or for a certain period of time. The keys can also be in the form of key-value pairs, where key 2 is a value of key 1, and as such the two units exchanging information are exchanging a key and a value in opposite directions, which are then compared and validated either by one of the units or by the key comparator.

The keys can take the form of data signals, in one example. In one implementation, the keys can be sent over two different tamper traces of a tamper mesh. The device can also determine, using a machine learning model, the conductive trace from amongst a plurality of conductive traces to monitor for a potential tamper attempt, the source or destination unit to choose for such bidirectional communication, or the key-value pairs to send on the selected traces.

Further, a first key of the keys can be sent from a source to a destination over a first tamper trace; and a second data signal of the keys can travel from the destination to the source via the same tamper trace, i.e., the first trace, or over another trace, such as a second trace. In a broader implementation, data signals can be sent over multiple different paths from a source to a destination. The data signals travel in a single direction, i.e., from a source unit to a destination unit or a destination unit to a source unit over a specific path. The source unit (primary/secondary unit 22-1) and the destination unit (secondary/primary unit 22-1) then exchange the sent and received information to determine whether a trace may be exposed or subjected to a fraudulent attack. In another implementation, the source and the destination sent the information to a key comparator associated with the key generator, to determine whether the keys that were sent managed to travel without any alternation, generally caused due to a tamper attempt.

In the context of the example case shown in FIG. 2, the primary unit 22-1 receives key 1 from the crypto generator 26-1 and the secondary unit 22-1 receives key 2 from the crypto generator 26-2. Through the established channels, the primary unit 22-1 trasmits key 1 to secondary unit 22-1 on tamper trace A via interfaces A and B. Either synchronously or asynchronously, the secondary unit 22-1 transmits key 2 to primary unit 22-1 through interfaces B and A via trace A.

The received keys by primary unit 22-1 and secondary unit 22-1 are represented by key 1' and key 2'. Such keys are compared by the crypto comparator 26-2, which in one implementation, is implemented using hardware or software implemented logic gates, buffers, operational amplifiers, and the like. The crypto comparator 26-2 compares the key 1, a copy of which is obtained by the crypto generator 22-1 (connection to the crypto comparator shown via dotted lines) or obtained by interfacing with the bus (not shown) that transmits the key 1 to the primary unit 22-1, to key 1' obtained from the secondary unit 22-1. The crypto comparator 26-2 can then yield a response indicative of whether key 1 and key 1' are same or substantially similar. For substantial similarity, the crypto comparator 26-2 may apply a check to determine whether the difference between key 1 and key 1' is within a threshold. The threshold check further determines whether the difference between the keys is within a range of acceptability defined by an acceptance critierion, such as acceptable levels of error, acceptable levels of values, acceptable levels of encryption, and so on. In some implementations, the device can correct, at an error correction code circuitry of the device, the received first key or the second key based on an error correction code, wherein the error correction code is capable of correcting up to a threshold number of errors in the received keys as compared to the predetermined transmitted keys; and identify, by the device, the tamper attempt when the error correction code is not capable of correcting the errors in the received keys.

In a similar way, the crypto comparator 26-2 can yield a response indicative of whether key 2 sent by secondary unit 22-1 via interface B and A to primary unit 22-1 and key 2' obtained by primary unit 22-1 are same or substantially similar. If the response indicates that the keys 1 and/or 2 are not the same or substantially similar, the crypto comparator 26-2 may do a variety of things. Such a response may be an indicator that the device is under attack, accordingly, the crypto comparator 26-2 may trigger an action to counter the attack. Optionally or alternatively, the crypto comparator 26-2 may send an interrupt to request the crypto generator 26-1 to re-send a new pair of keys to confirm whether or not an attack is happening or whether it is just a false tamper event, such as one caused by temperature or pressure variations as in one caused by a mere dropping or relocation of the device. However, if the crypto comparator 26-2 is certain of the attack, whether through the first or the second key transmission and comparison, the crypto comparator 26-2 can initiate or cause initiation of remedial actions. For example, in one case, the crypto comparator 26-2 may send an interrupt to the address generator 34 requesting the address generator to change the addresses of the access control units 22-1 . . . N, in order to avoid access to those units.

Furthermore, the crypto comparator 26-2 can in addition, or alternatively, send another interrupt, to the database 24 to either self-destruct or transfer the contents to a redundant or load-management database. The crypto-comparator 26-2 may also send an interrupt, in a similar way, to the access control units 22 or other memory management units, for example to disable either permanently, temporarily, or for a specific duration, the operations of the device based on change in access control rules. For example, the access control rules include an identifier of a unit within the device, such as a source unit or destination unit; address range of the source or destination unit; access permissions; access authorization levels; nature of operations associated with the access control units; and rules related to memory/data/resources access. The rules may operate in a number of modes to accommodate for remedial actions when an attack happens. Further, a state machine (not shown) may store history of states of the units and device to prevent attempts to restore the device or specific units to previous state. In yet other implementations, the crypto comparator 26-2 can send an interrupt to reset the clock 36 (connetion not shown)

In some implementations, the tamper detection device 1, including the source unit and the destination unit, may be configured to authenticate incoming data signals using a authentication function (e.g., a cryptographic hash function)

that provides a digital signature to allow the hardware being reprogrammed to confirm the identity of the source of the signals. The authentication function can be implemented by a non-invertible function that allows decrypting, using a first key of a key pair, a message that has been encrypted using a second key of the key pair. Examples of authentication funtion include RSA cipher functions based on factorization of large prime numbers, cryptographic functions based on elliptic curves, and cryptographic hash functions. In certain implementations, an authentication function may be implemented by a cryptographic hash and one or more cryptographic keys shared between an authorized programming agent and a programmable hardware functional unit, as described in more details herein below.

In one implementation, the secure unit appends the information to a data signal or a clock signal before sending on the conductive connection. The secure unit can also include a machine-learning model to determine the conductive connection from amongst a plurality of conductive connections to monitor for a potential tamper attempt, where the determination is based on a level of sensitivity associated with data stored in the primary and/or secondary unit. The secure unit is configured to determine whether to perform at least one secure operation based on an error correction code associated with the detected tamper event, wherein the error correction code signifies whether error caused by the detected tamper event is successfully adjusted.

Figure 3:
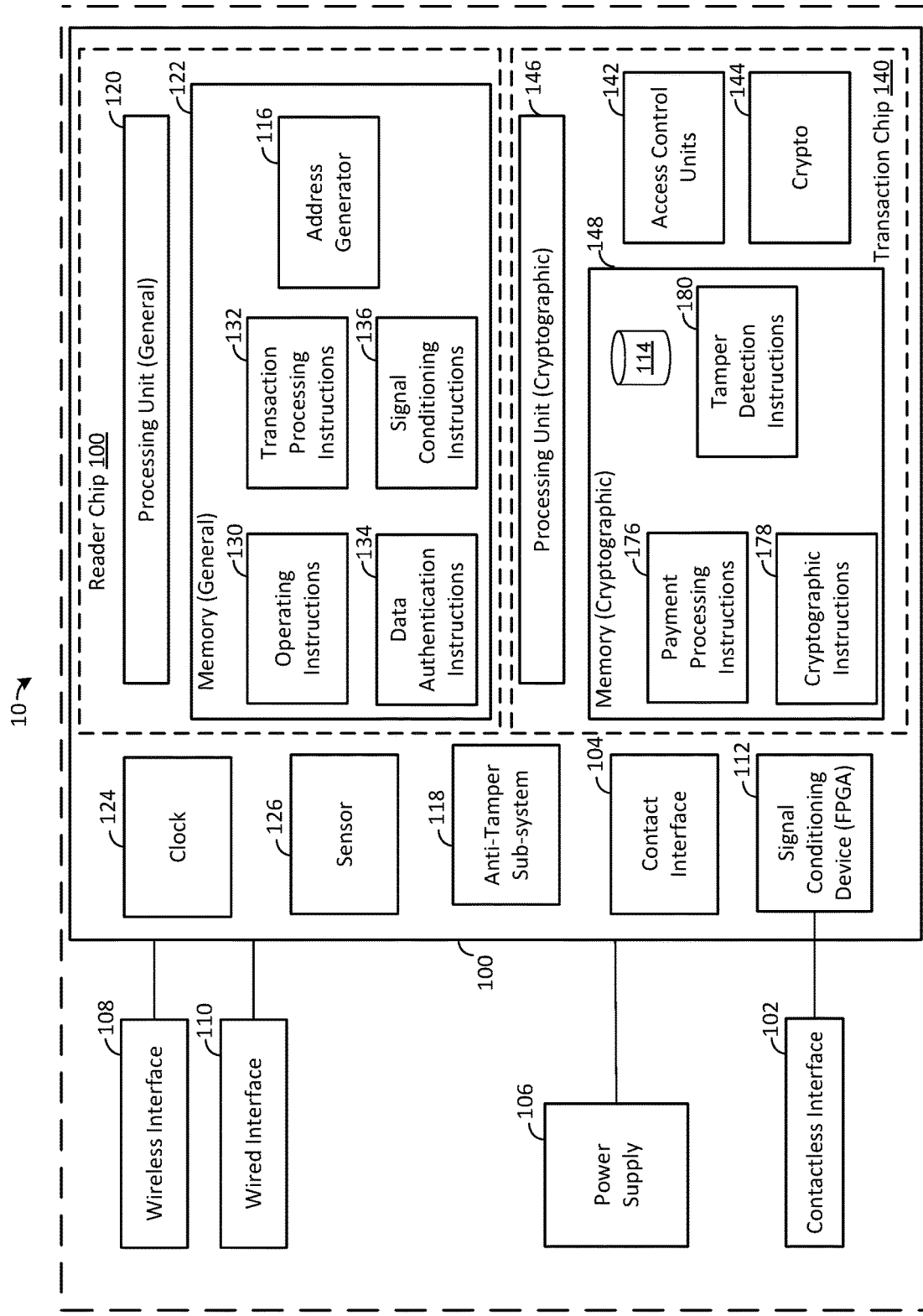
FIG. 3 is an illustrative block diagram of the payment reader in accordance with some embodiments of the present disclosure.

FIG. 3 depicts a block diagram of an exemplary payment reader 10 in accordance with some embodiments of the present disclosure. Although particular components are depicted in a particular arrangement in FIG. 3, it will be understood that payment reader 10 may include additional components, payment reader 10 and the components of payment reader 10 may be rearranged in any manner. In one embodiment, payment reader 10 includes a reader chip 100, a plurality of payment interfaces (e.g., a contactless interface 102 and a contact interface 104), a power supply 106, a wireless communication interface 108, a wired communication interface 110, a signal conditioning device 112 and anti-tamper devices 118 (same as or similar to tamper sub-system 28). In an embodiment, the reader chip 100 of payment reader 10 may include a general processing unit 120, general memory 122, a cryptographic processing unit 146 and cryptographic memory 148, an address generator 116 (same or similar to address generator 34), and access control units 142.

In exemplary embodiments, any suitable components or combinations thereof may be utilized to detect and prevent tamper actions, including attempts made to physical interfaces, circuit traces, wires, discrete components, memories, logical operations, FPGAs, antennas, terminals, enclosures, test points, sensors, cameras, and other similar components. As described herein, the access control units 142 may have unique physical characteristics that may be accessed or measured, such as by accessing tamper traces, which may reflect in change in analog values (e.g., current, voltage, etc.) or digital values (keys, sequences, one time pads, nonces, etc.) transmitting through those traces. The tamper traces may be included in the anti-tamper device 118.

Although in one embodiment the processing units memories, contact interface 104, signal conditioning device 112, and anti-tamper device 118 will be described as packaged in a reader chip 100, and configured in a particular manner, it will be understood that general processing unit 120, general memory 122, a cryptographic processing unit 146, cryptographic memory 148, contact interface 104, signal conditioning device 112, and anti-tamper circuit 118 may be located and configured in other suitable manners to perform the functionality of the payment reader 10 as is described herein. It will also be understood that the functionality of reader chip 100 may be embodied in a single chip or a plurality of chips, each including any suitable combination of processing units, memory, and other components to collectively perform the functionality of reader chip 100 described herein.

In some embodiments, reader chip 100 may be a suitable chip having a processing unit. Processing unit 120 of reader chip 100 of payment reader 10 may be a suitable processor and may include hardware, software, memory, and circuitry as is necessary to perform and control the functions of payment reader 10. Processing unit 120 may include one or more processors, and may perform the operations of reader chip 100 based on instructions provided from any suitable number of memories and memory types. In some embodiments, processing unit 120 may have multiple independent processing units, for example a multi-core processor or other similar component. In an embodiment, processing unit 120 may execute instructions stored in memory 122 of reader chip 100 to control the operations and processing of payment reader 10. As used herein, a processor or processing unit may include one or more processors having processing capability necessary to perform the processing functions described herein, including but not limited to hardware logic (e.g., hardware designed by software that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium. In some embodiments, components of the processing unit (e.g., clock sources, transistors, terminals, etc.) or characteristics of the processing unit (e.g., time to perform different computational operations and workloads) may be utilized, in conjunction with key comparison described in FIG. 2 to determine whether a tamper event has occurred. In an embodiment, the processor may use cryptographic generator and/or comparators 144 to establish whether or not a tamper event has occurred.

In an exemplary embodiment, the processing unit 120 of reader chip 100 may include two RISC processors configured to operate as a hub for controlling operations of the various components of payment reader 10, based on instructions stored in memory 122. As used herein, memory may refer to any suitable tangible or non-transitory storage medium. Examples of tangible (or non-transitory) storage medium include disks, thumb drives, and memory, etc., but do not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory (embedded or non-embedded), disks or optical storage, magnetic storage, or any other non-transitory medium that stores information that is accessed by a processor or computing device.

Reader chip 100 may also include additional circuitry such as interface circuitry, analog front end circuitry, security circuitry, and monitoring component circuitry. In one embodiment, interface circuitry may include circuitry for interfacing with a wireless communication interface 108 (e.g., Wi-Fi, Bluetooth classic, and Bluetooth low energy), circuitry for interfacing with a wired communication interface 110 (e.g., USB, Ethernet, FireWire, HDMI and Lightning), circuitry for interfacing with other communication interfaces or buses (e.g., I²C, SPI, UART, and GPIO), and circuitry for interfacing with a power supply 106 (e.g., power management circuitry, power conversion circuitry, rectifiers, and battery charging circuitry).

In an exemplary embodiment, reader chip 100 may perform functionality relating to processing of payment transactions, interfacing with payment devices, cryptography, and other payment-specific functionality. In some embodiments, reader chip 100 may include a cryptographic processing unit 125 for handling cryptographic processing operations. Note that each of general processing unit 120 and cryptographic processing unit 144 may have dedicated memory associated therewith (e.g., general memory 122 and cryptographic memory 148). In this manner, specific cryptographic processing and critical security information (e.g., cryptographic keys, passwords, sequences, user information, etc.), may be securely stored by cryptographic memory 128 and processed by cryptographic processing unit 144.

One or both of general processing unit 120 and cryptographic processing unit 144 of reader chip 100 may communicate with the other (e.g., processing unit 120 may communicate with cryptographic processing unit 144 and vice versa), for example, using any suitable internal bus and communication technique. In this manner, reader chip 100 can process transactions and communicate information regarding processed transactions (e.g., with merchant device 20).

Reader chip 100 may also include circuitry for implementing a contact interface 104 (e.g., power and communication circuitry for directly interfacing with an EMV chip of a chip card 3 that is inserted into slot). In some embodiments, reader chip 100 also may also include a signal conditioning FPGA 112 and analog front end circuitry for interfacing with contactless interface 102 (e.g., electromagnetic compatibility (EMC) circuitry, matching circuits, modulation circuitry, and measurement circuitry). Contact interface 104 may be a suitable interface for providing power to a payment chip such as an EMV chip of a chip card 3 and communicating with the EMV chip. Contact interface 104 may include a plurality of contact pins (not depicted in FIG. 3) for physically interfacing with the chip card 3 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card 3 are able to exchange information such as payment information. Note that, in some embodiments, contact interface 104 may be housed on reader chip 100 and may communicate with the various components of reader chip 100 via any suitable means (e.g., a common internal bus). Aspects of any of these components may be queried or measured to acquire PUF information as described herein. For example, analog and/or digital values associated with particular operational states of the components of contact interface (e.g., traces, discrete components, card interface, terminals, etc.) may be determined or measured based on initial states or particular applied signals. Other sources for acquiring PUF information may include transient and/or random delay in transmitting bits of information over the contact card interface and variations in voltage levels used to transmit and receive data.

Contactless interface 102 may provide for NFC communication with a contactless device such as NFC device or chip card 3. Based on a signal provided by reader chip 100, an antenna of contactless interface 102 may output either a carrier signal or a modulated signal. A carrier signal may be a signal having a fixed frequency such as 13.56 MHz. A modulated signal may be a modulated version of the carrier signal according to a modulation procedure such as ISO 14443 and ISO 18092. When the payment reader 10 is inductively coupled to a contactless device, the contactless device may also modulate the carrier signal, which may be sensed by the contactless interface 102 and provided to the reader chip 100 for processing. Based on these modulations of the carrier signal, payment reader 10 and a contactless device are able to communicate information such as payment information. In some embodiments, one or more characteristics of the contactless interface may be measured, or the contactless interface may be used to measure other operational characteristics of the device such as RF emissions. For example, other components of the device may have characteristic RF emissions that may be sensed by the contactless interface when it is not emitting a NFC carrier or data signal. Other components may be cycled through various operational routines (e.g., frequency, power, waveform) that may impact the manner in which a resulting periodic signal is sensed by the contactless interface and provide a source of PUF information. Moreover, the contactless interface 102 transmit and receive paths include one or more antenna portions, matching circuitry, filters, amplifiers, and other similar components.

Power supply 106 may include one or more power supplies such as a physical connection to AC power, DC power, or a battery. Power supply 106 may include power conversion circuitry for converting an AC or DC power source into a plurality of DC voltages for use by components of payment reader 10. When power supply 106 includes a battery, the battery may be charged via a physical power connection, via inductive charging, or via any other suitable method. Although not depicted as physically connected to the other components of the payment reader 10 in FIG. 3, power supply 106 may supply a variety of voltages to the components of the payment reader 10 in accordance with the requirements of those components.

The payment reader 10 may provide an appealing target for an attacker, since, as described above, it provides a central point for receiving payment via multiple interfaces and for communicating that information with other devices (e.g., merchant device 29). Attackers may attempt to tamper with payment reader 10 in order to access internal electrical connections that carry signals to the various payment interfaces or communication interfaces, or processors or other circuitry of payment reader 10. Accordingly, payment reader 10 may include numerous mechanisms for monitoring and preventing attempts to tamper with the hardware of payment reader 10, such as anti-tamper devices 118. For example, in some embodiments, anti-tamper devices 118 of payment reader 10 may include tamper switches that change their electrical state in response to an attempt to open the housing of payment reader 10, insert a device other than a payment card into payment slot 21 or a magnetic stripe reader, place an improper device in proximity to the NFC interface of payment reader 10, or otherwise attempt to gain physical or electrical access to any components of payment reader 10.

In some embodiments, anti-tamper devices 118 may comprise a tamper switch, which may be a component that changes its electrical state in response to a physical stimulus. Exemplary tamper switches may be located at various locations of a payment reader 10, such that any attempt to open the enclosure of payment reader 10, or to modify the physical structure of payment reader 10, may cause the tamper switch to change its physical state (e.g., resulting in an open circuit).

In some embodiments, anti-tamper devices 118 may comprise a tamper switch that changes its electrical state in response to an electrical stimulus. An exemplary payment reader 10 may have a number of connection points at which it is possible to apply an electrical signal to the connection points. For example, in some embodiments a payment slot 21 (FIG. 2) of payment reader 10 may have EMV pins that interface with corresponding pins of an EMV card. An attacker may attempt to access those pins to monitor the pins (e.g., the I/O pin) or to provide malicious signals to payment reader 10 (e.g., by spoofing an EMV card). In some embodiments, a tamper switch may respond to signals that do not match expected signal characteristics (e.g., current, voltage, duty cycle, waveform, capacitance, etc.) and modify its electrical state (e.g., by opening a circuit, closing a circuit, modifying an electrical signal's amplitude or phase, etc.). Although such a tamper switch has been described in the context of the pins of an EMV payment slot 21 (FIG. 2), it will be understood that such a tamper switch may be implemented on any electrical signal lines or connections of payment reader 10.

In some embodiments, an attacker may attempt an attack that does not require physical access to the payment reader 10, for example, by sending radio frequency (RF) electromagnetic signals in order to create or modify a signal within payment reader 10, or to temporarily or permanently disable or modify the operation of one or more components of the payment reader 10. Exemplary anti-tamper devices 118 may comprise a tamper switch that may respond to sensed characteristics of RF signals that are abnormal or correspond to an attack, such as a signal strength, waveform, frequency, duty cycle, etc. In response to such sensed characteristics the tamper switch may modify its electrical state (e.g., by opening a circuit, closing a circuit, modifying an electrical signal's amplitude or phase, etc.).

Another exemplary anti-tamper device 118 may comprise a tamper mesh that may provide for a complete enclosure of the internal components of the payment reader 10 or critical components thereof. In some embodiments, a tamper mesh may include conductive traces in close proximity and creating a pattern that covers the protected components. It may be difficult to gain physical access to the components without damaging the conductive mesh due to the unique and dense pattern of the tamper mash. This results in a change in the electrical state of the tamper mesh (e.g., by opening a circuit, closing a circuit, modifying an electrical signal's amplitude or phase, etc.) that may be used to sense a tamper attempt and take corrective or remedial action. The tamper mesh may be connected to the access control units 142 and the crypto 144. The crypto 144, in one embodiment, generates keys, sequences, nonces, OTPs, etc., to pass along on the traces of the temper mesh and compares the received keys to detect a tamper attempt, or to constantly monitor the tamper mesh for any attempts. In one implementation, a bidirectional protocol is implemented for the purpose above. Also, the anti-tamper device 118 may monitor a specific pin, trace, or a secure unit for potential tamper attempts. For example, the device may implement a machine-learning model, such as an unsupervised learning model, to determine which traces or interconnects should be monitored at any given time.

In one embodiment, the anti-tamper device 118 includes a key generator 144, such as software or hardware based system, which generates a set of keys or addresses, which may be static or dynamic, and that randomly change over a period of time or for a session, to prevent deterministic prediction of a future state of the device based on past states or fraudulently obtained key information. The keys may either be related to each other or completely unrelated. Further, such key(s) may be generated based on hardware or software characteristics of the device, location, merchant, environment in which the device operates, time of the day, etc. The characteristics may be used to generate unique information, such as patterns of bits, which may be difficult to duplicate. One or more cryptographic units may be utilized for encryption, for example, as a source of key values, as seed values for encryption, or in other similar manners.

The keys can take the form of data signals, in one example. In one implementation, the keys can be sent over two different tamper traces of a tamper mesh. Further, a first key or data signal can be sent from a source to a destination over a first tamper trace; and a second key or data signal can travel from the destination to the source via the same tamper trace, i.e., the first trace, or over another trace, such as a second trace. In a broader implementation, data signals can be sent over multiple different paths from a source to a destination. The data signals travel in a single direction, i.e., from a source unit to a destination unit or a destination unit to a source unit (of the access control units 142) over a specific path. The source unit and the destination unit then exchange the sent and received information to determine whether a trace may be exposed or subjected to a fraudulent attack. In another implementation, the source and the destination sent the information to a key comparator associated with the key generator, to determine whether the keys that were sent managed to travel without any alternation, generally caused due to a tamper attempt.

In some embodiments, an anti-tamper device 118 may comprise an anti-tamper temperature circuit for measuring a temperature within payment reader 10, comparing the measured temperature against one or more threshold temperatures, and performing a response when a tamper attempt is detected. The anti-tamper temperature circuit may comprise temperature sensing components (e.g., polysilicon resistor circuitry) and any combination of hardware, software or otherwise for comparing the temperature within payment reader 10 with a threshold. In some embodiments, anti-tamper temperature circuit may be coupled to other anti-tamper devices 118 (e.g., tamper switch) for controlling operation of the anti-tamper devices 118 (e.g., shutting down the anti-tamper device 118) in response to a measured temperature or a comparison of a measured temperature with one or more pre-defined temperature thresholds.

Any of the anti-tamper devices 118 or any suitable combination thereof may provide a mechanism for detecting tamper and applying or initating a remedial action. Accordingly, on detection of a tamper event, the tamper detection instructions having access control rules may determine and even trigger an automatic response to attacks. For example, the access control rules include the allowing or preventing access to resources, based on authentication requirements, date range for access, time range for access, and/or level of tamper events. For example, depending on the criticality of the tamper event, measured in quantifiable terms, the access control rules may determine temporary or permanent disabling of a database 114 storing access data and other sensitive data. The access control rules may also disconnect access to the access control units or the cryptographic memory altogether. The tamper detection instructions may condition how and which analog and/or digital values to associate with particular operational states of the components (e.g., traces, discrete components, card interface, terminals, etc.) and how to measure based on initial states or particular applied signals, especially when a tamper event is detected.

In some embodiments, monitoring of the traces in the anti-tamper devices 118 may be initially performed by an anti-tamper circuit—not shown (e.g., that may operate in a low power mode or based on an alternative low power source). The monitoring may be performed periodically or in some embodiments the timing of monitoring may be randomized (e.g., based on a random number generator) such that the timing of the monitoring is not predictable (e.g., by selectively providing power to the real time clock based on a randomized pattern). By only monitoring the tamper devices for a portion of the time it may be possible to achieve a small average current consumption by the anti-tamper circuit of the tamper devices 118.

In an embodiment, anti-tamper device 118, as determined by the tamper detection instructions 180, may provide notifications to other components of the payment reader 10 that a tamper attempt has been detected. Notifications may be stored (e.g., in a memory associated with the anti-tamper device 118) to be provided to other components of the payment reader 10 (e.g., processing unit 120) when they receive power, or in some embodiments, may be provided (e.g., as an interrupt) in a manner that causes one or more components to wake up. Once a tamper attempt is identified, the tamper attempt may be recorded and/or processed, e.g., by taking corrective action, providing notifications, deleting critical information (e.g., from cryptographic memory 128), disabling communication interfaces, modifying characteristics of access control units or disabling access to access control units, changing address of the access control units via the address generator 116, modifying error correction procedures associated with access control units, any other suitable response, or any combination thereof. In some embodiments, some or all of this processing may be performed by the anti-tamper device 118.

Wireless communication interface 108 may include suitable wireless communications hardware (e.g., antennas, matching circuitry, etc.) and one or more processors having processing capability necessary to engage in wireless communication (e.g., with a merchant device 20 via a protocol such as Bluetooth low energy) and control associated circuitry, including but not limited to hardware logic, computer readable instructions running on a processor, or any suitable combination thereof.

Wired communication interface 110 may include any suitable interface for wired communication with other devices or a communication network, such as USB, Lightning, HDMI or mobile HDMI, FireWire, Ethernet, any other suitable wired communication interface, or any combination thereof. In some embodiments, wired communication interface 110 may allow payment reader to communicate with one or both of merchant device 10 and payment server 40.

In some embodiments, reader chip 100 may include a signal conditioning device 112 coupled to the contactless interface 102 to process signals provided to and received from the contactless interface 102. Although signal conditioning device 112 may include any suitable hardware, software, or any combination thereof, in an exemplary embodiment signal conditioning device may comprise an FPGA. Signal condition device 112 may condition sent and received signals to and from contactless interface 102, such as when a payment device 10 using NFC communication communicates with payment reader 10. In an embodiment, signal conditioning device 112 may operate based on instructions stored at reader chip 100 (e.g., signal conditioning instructions 136) for use in interacting with the contactless interface 102.

In some embodiments, reader 22 may include PUF measurement circuitry, which may be separate from reader chip 100, general processing unit 120, and/or cryptographic processing unit 146, or may be at least partially integrated with some or all of these components.

In some embodiments, general memory 122 may be any suitable memory as described herein, and may include a plurality of sets of instructions for controlling operations of payment reader 10 and performing general transaction processing operations of payment reader 10, such as operating instructions 130, transaction processing instructions 132, and anti-tamper instructions 180.

Operating instructions 130 may include instructions for controlling general operations of the payment reader 10, such as internal communications, power management, processing of messages, system monitoring, sleep modes, user interface response and control, operation of the contact interface 104, the wireless interface 108, the wired interface 110, or the signal conditioning device 112, and the management of the other sets of instructions. In one embodiment, the operating instructions 130 may provide the operating system and applications necessary to perform most of the processing operations that are performed by the processing unit 120 of the reader chip 100 of payment reader 10.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 10 (e.g., via wireless interface 108). The operating instructions 130 facilitate processing of the payment, for example, by acquiring payment information via the contactless interface 102 or contact interface 104, and invoking the various resources of reader chip 100 to process that payment information (e.g., by executing memories stored in cryptographic memory 128 using cryptographic processing unit 125), and by generating responsive messages that are transmitted to the point-of-sale application of the merchant device 20 via wireless communication interface 108 and wired communication interface 110.

Operating instructions 130 may also include instructions for interacting with a payment service system 50 at a payment server 40. In one embodiment, a payment service system 50 may be associated with the payment reader 10 and the point-of-sale application of the merchant device 20. For example, the payment service system 50 may have information about payment readers 22 and merchant devices 20 that are registered with the payment service system 50 (e.g., based on unique identifiers and/or PUF values). This information may be used to process transactions with servers of the merchant and customer financial institutions, for providing analysis and reports to a merchant, and aggregating transaction data. The payment reader 10 may process payment information (e.g., based on operation of reader chip 100) and communicate the processed payment information to the point-of-sale application, which in turn communicates with the payment service system 50. In this manner, messages from the payment reader 10 may be forwarded to the payment service system 50 of payment server 40, such that the payment reader 10 and payment service system 50 may collectively process the payment transaction.

Transaction processing instructions 132 may include instructions for controlling general transaction processing operations of the payment reader 10, such as controlling the interaction between the payment reader 10 and a payment device 10 (e.g., for interfacing with a payment device via the contactless interface 102 and contact interface 104), selecting payment processing procedures (e.g., based on a payment processing entity associated with a payment method), interfacing with the cryptographic processor 146, and any other suitable aspects of transaction processing.

Transaction processing instructions 132 also may include instructions for processing payment transactions at payment reader 10. In one embodiment, the transaction processing instructions may be compliant with a payment standard such as those promulgated by EMV. Depending on the payment method that is being used (e.g., brand of the card, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with cryptographic processing unit 146 to perform most transaction processing operations. In addition, transaction processing instructions 132 may provide instructions for acquiring any suitable information from a chip card (e.g., via contact interface 104 and cryptographic processing unit 146) such as authorization responses, card user name, card expiration, etc.

Anti-tamper instructions 180 may include instructions for operating anti-tamper circuit of the anti-tamper devices 118, disabling resources of payment reader 10 when a tamper attempt is detected, and in the absence of a tamper attempt, may permit normal operations of the payment reader 10. In some embodiments, anti-tamper instructions 180 may include instructions for monitoring one or more pins of reader chip 100 (not specifically shown) coupled to one or more resources of anti-tamper circuit to identify detection of a tamper attempt by the anti-tamper device 118. For example, anti-tamper instructions 180 may include instructions for monitoring and tracking a key provided to a wake-up pin by an anti-tamper circuit and whether it is transmitted from a first pin to a second pin substantially unchanged in a number of directions, as well as signals that are indicative of a tamper attempt or type of tamper attempt. In some embodiments, some or all aspects of anti-tamper instructions 180 may be stored in cryptographic memory 148 and may be executed by cryptographic processing unit 146.

Anti-tamper instructions 180 may include instructions for taking action when an output of anti-tamper circuit indicates a tamper attempt. In some embodiments, anti-tamper instructions 180 may include instructions for providing a tamper notification, such as to merchant device 29, payment server 40 via network 30, or to a user of payment terminal 20. The tamper notification may comprise a suitable notification, such as a message transmitted via wireless interface 108 or wired interface 110 of payment reader 10 or an audible, visible, or physical alarm signal. In an embodiment, a tamper notification may be provided via a resource of payment reader 10, and may provide a notification to a user of detection of a tamper attempt (e.g., output of light, sound, mechanical vibration, a combination thereof, or other output).

In some embodiments, anti-tamper instructions 180 may include instructions for controlling resources of payment reader 10, for example, in order to limit or prevent an intruder's access to information of the payment reader 10. For example, in some embodiments, anti-tamper instructions 180 may include instructions for disabling interfaces of payment reader 10 or access control units of payment reader 10, for example, to prevent further acquisition or transmission of potentially sensitive data. Anti-tamper instructions 180 may include instructions for general processing unit 120 to provide a signal to disable power supply 106 or clock 124. In this regard, general processing unit 120 may selectively disable a supply of power from power supply 106 to various resources of payment reader 10, such as any of the interfaces of payment reader 10 or reader chip 100.

In some embodiments, anti-tamper instructions 180 may selectively disable resources of payment reader 10 that an attacker may attempt to access in order to acquire potentially sensitive information while permitting other resources (e.g., anti-tamper circuit) to continue to operate. For example, anti-tamper instructions 180 may include instructions for removing, erasing, deleting or wiping one or more encryption keys stored in cryptographic memory 148 in order to prevent access to encrypted data when a tamper attempt is detected. Similarly, anti-tamper instructions 180 may include instructions for removing, erasing, deleting or wiping any suitable information from general memory 122, key database 114, or cryptographic memory 128, such as user information (e.g., personally identifiable information, financial account information, or otherwise) in response to detection of a tamper attempt. In this regard, anti-tamper instructions 180 may include instructions for continuing to monitor an output of anti-tamper device following detection of a tamper attempt and taking steps to further disable operation of payment reader 10 (e.g., completely power down payment reader 10) if one additional tamper attempt is detected within a pre-determined amount of time. Anti-tamper instructions 180 may include other instructions for performing other operations in other embodiments.

In some embodiments, anti-tamper instructions 180 may include instructions for collecting tamper attempts that may be identified locally at payment reader 10 or that may be transmitted to an external system (e.g., payment server 40) for storage, analysis, and complex processing of a tamper event (e.g., based on other known tamper events that are occurring in similar circumstances). In some embodiments, such an external analysis may result in a signal being received at general processing unit 120, which may shut off power to one or more components of reader chip 100 or payment reader 10 in response to that input.

Cryptographic processing unit 146 may be any suitable processor as described herein, and, in some embodiments, may perform cryptographic functions for the processing of payment transactions. For example, in some embodiments a cryptographic processing unit 146 may encrypt and decrypt data based on one or more encryption keys provided by access control units, in a manner that isolates the encryption functionality from other components of payment reader 10 and protects the access control units and other memories from being exposed to other components of payment reader 10 or being stored permanently in memory. Further, the crypto 144 can generate keys specifically for the purpose of tamper detection or monitoring. For example, the crypto 144 can generate a pair of keys to transmit on the traces, where each of the key of the pair is sent in a direction different from the other. The keys can be randomly selected and asynchronously transmitted so it becomes difficult to replicate or anticipate information sent along the traces. Further more, since the system sends pairs or plurality of keys along multiple traces, it makes difficult for an attacker to know which traces are being monitored at any given time.

In some embodiments, cryptographic memory 148 may be any suitable memory or combination thereof as described herein, and may include a plurality of sets of instructions for performing cryptographic operations, such as payment processing instructions 176, cryptographic instructions 178, and tamper detection instructions 180. Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 146 may execute the cryptographic instructions 178 to perform a variety of cryptographic functions, such as to encrypt, decrypt, sign, or verify a signature upon payment and transaction information as part of a payment transaction.

Figure 4:
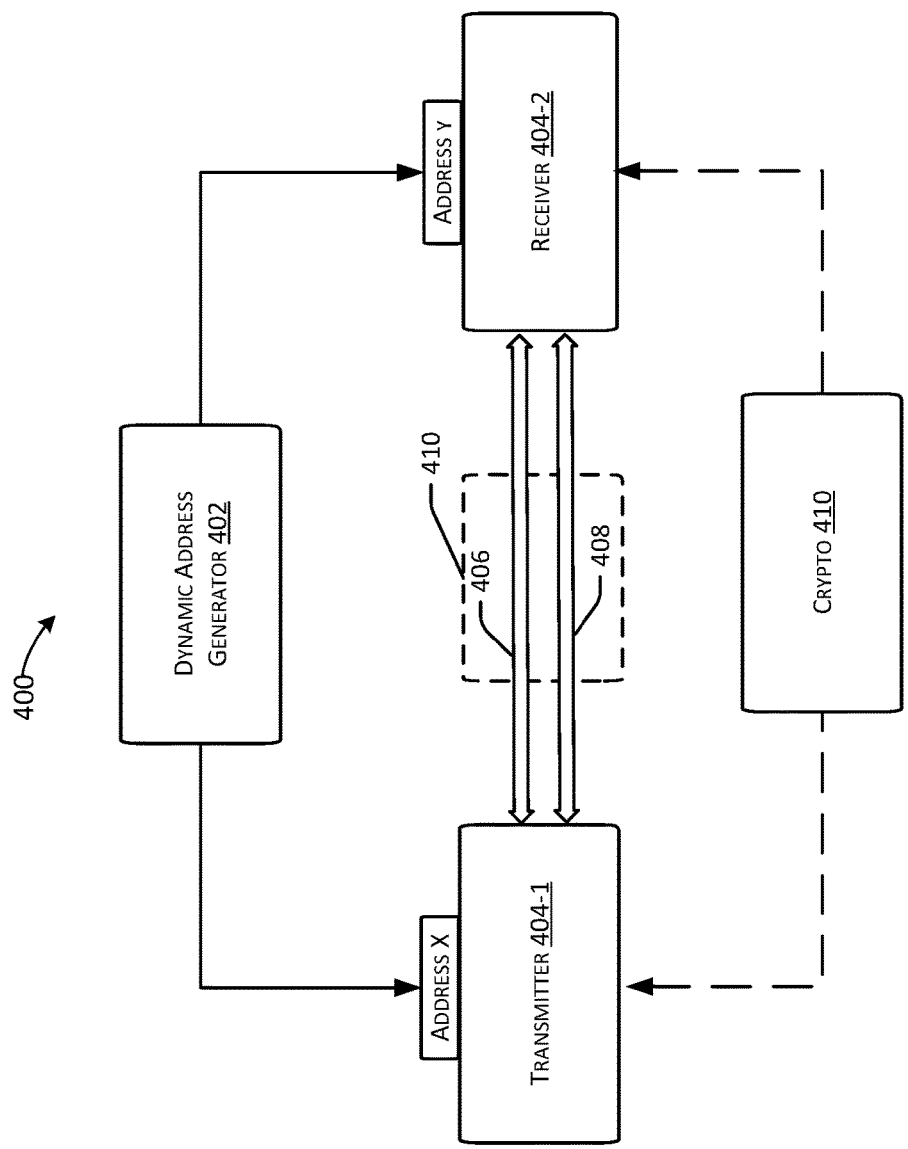
FIG. 4 is an illustrative block diagram of a device equipped with tamper detection in accordance with some embodiments of the present disclosure.

FIG. 4 depicts an exemplary anti-tamper device 400 in accordance with some embodiments of the present disclosure. In certain embodiments, an anti-tamper mesh 410 (similar to tamper sub-system 28) may include a pattern of electrical traces that form an overall mesh structure that makes it difficult to access underlying components. While the figure shows only two traces 406 and 408, it will be understood that there may be fewer or more traces depending on the implementation. Signal traces may be in a variety of patterns and in some embodiments may include one or more series traces that form an open circuit when the series electrical path in broken. The traces may overly each other in which vertical lines one represent one series-connected path and horizontal lines represent another series-connected circuit path. In some examples, the traces may be parallel to each other or laid in any other symmetrical or asymmetrical fashion without any interconnections. In other embodiments additional connections may be provided such that a determination of a tamper attempt is based on other measured parameters, such as impedance or frequency response, or on whether a signal or value sent at one end is what is received at the other end. In other words, the tamper score can be increased with an I2C call and response on the digital traces.

Each of the traces of the anti-tamper mesh may be at a potential and may have a particular location with respect to adjacent traces. By connecting a pair of traces to measurement circuitry 410 (e.g., crypto generator 26-1 and comparator 26-2) an expected value that is representative of the value between multiple adjacent points (such as transmitter 404-1 and receiver 404-2) of the tamper mesh may be determined. Further, the measurement circuitry 404 can generate monitoring signals internally and send the generated signals over a plurality of signal traces, for example using a cryptography protocol, such as oblivious transfer protocol, virtual party protocol, BGW protocol, GMW protocol, and so on. In other implementations, the signals can be generated by a unit different from the measurement circuitry 410. The signals can be tied to the data signals, clock signals, or as a separate signal either synchronously or asynchronously with the data and clock signals.

When a signal (DC signal or phase shifted clock pulse, key, nonce, one time pad, information, query, etc.) is sent over the trace, a first signal signal travels over the trace and is measured at the receiving end to see if there were any attempts to read or spoof the signal being transmitted on the trace. Similarly, the measurement circuitry 410 sends a second signal in the opposite direction, where the first and the second signals may have a relationship to each other that only the measurement circuitry 410 is aware of. For example, the two signals may be pairs, such as differential correlated pairs. In the case of the first or second signal being a query, in one direction, can be a specific query for a destination unit, while in the other direction, can be another query for the source unit. Alternatively, in another example, the query in one direction can be a code that is to be decrypted while the query in the other direction may be the same code or a different code. Further, the pair or group of traces 406 and 408 selected for the purpose of tamper monitoring can be random and be switched at predetermined time intervals.

Since the measurement circuitry is the generator of the pairs, an anti-tamper mesh may have numerous values different from the signal values that may be measured and that may be dependent upon the manner and extent to which the tamper attempts are made. The received signals may be provided as analog or digital data, and in some embodiments, may be compared to a threshold to establish 0 or 1 binary values associated with a comparison between the measured values and a value threshold. Accordingly, a corrective action may be taken. For example, the measurement circuitry 410 can change the address assigned to the units, where sensitive information may be stored and which may now be exposed to the attacker. In an example, an address generator 402 can assign new addressed to the transmitter 404-1 having address X and receiver 404-2 having address Y after a tamper event. In another example, the address generator 402 can be a dynamic address generator that dynamically changes the address and accordingly, pair of traces that are exchanging keys for tamper monitoring purposes. The address generator 402 can change the address based on a tamper event being triggered or other factors, such as time, location, rotation of the device, and so on.

In an embodiment, some or all of one or more interior or exterior surfaces of the device (e.g., payment reader 10) or the tamper cage (not shown) surrounding the device may be coated with one or more layers having known conductive properties (e.g., a single partially conductive layer or a plurality of interleaved conductive and non-conductive layers). Further, the tamper cage may be made using multiple glass fiber transmission layers, where the amount of light received is an indicator of tamper event. For example, if the amount of light received and compared to a window of values yields a value lower or higher than the window, the event may be classified as a tamper event and a remedial action may be implemented by the device. Thus, a number of measurement points may be provide on one or more of the layers to measure characteristics of the coating, for example, by measuring light, voltage, impedance, of applying signals to the cage. In an embodiment, dozens or hundreds of measurement points may selectively apply predetermined signals and predetermined signal patterns to the conductive layer, the measurement of which may provide analog or digital data and/or binary 0 and 1 values based on comparison with thresholds. In addition to providing a value corresponding to the coating, the application of signals to the coating may also provide for tamper detection based on changes in sensed signal values. In some embodiments, the tamper detection may execute automatically as the resulting value may not be successfully determined in response to a tamper attempt.

Figure 5:
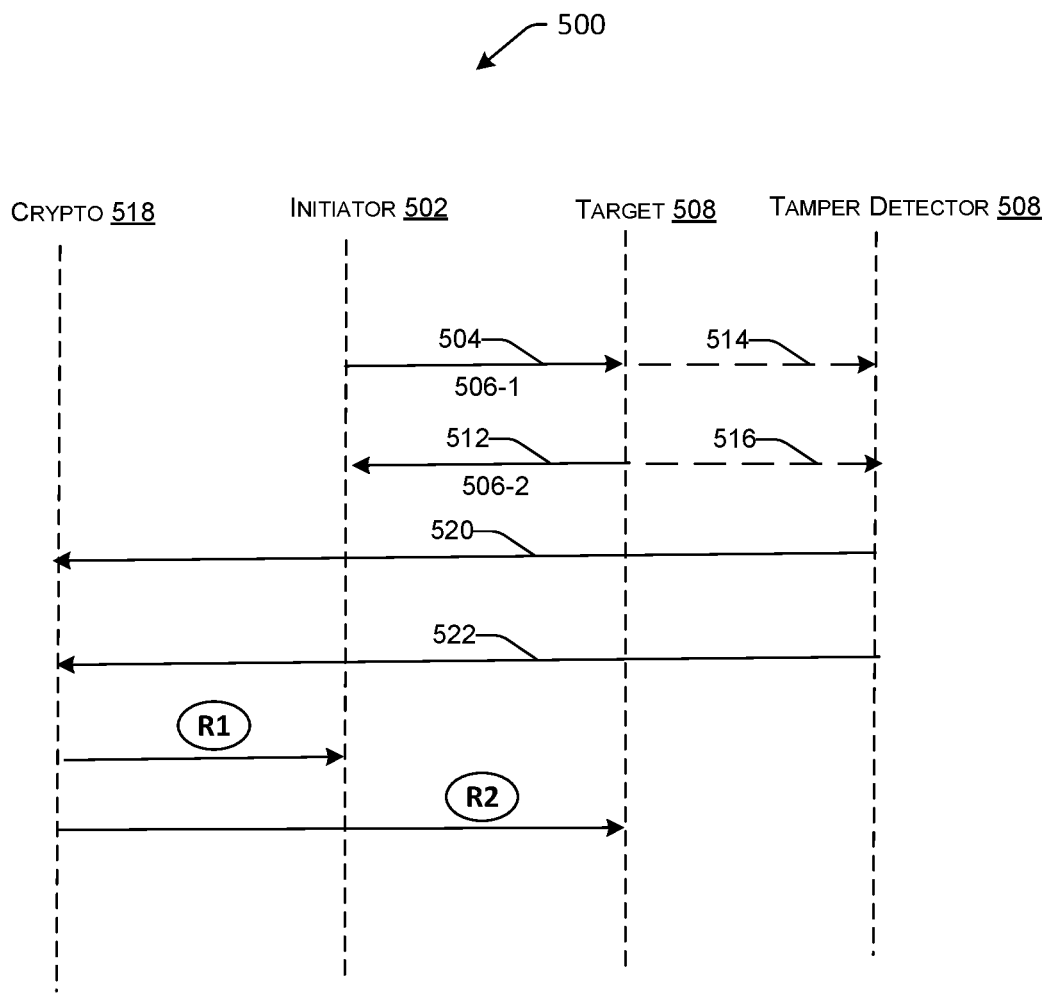
FIG. 5 is an exemplary diagram of a swim lane diagram showing ways to define access control rules, in accordance with one or more embodiments of the present disclosure.

FIG. 5 is a swim lane diagram 500 illustrating ways to define access control rules, in accordance with one or more embodiments of the present disclosure. The access control rules may define the conditions in which an entity, internal or external, such as memory, device, etc., can access data, sensitive or otherwise. The access control rules may define an identifier of the device requesting access, identifier of the device which is being accessed, the addresses of the two devices, access conditions corresponding to the devices, and so on. In case of an anamoly, for example a detected tamper event or perceived tamper attempt, the access control rules can be changed.

In one implementation, an initator 502 sends information 506-1 (e.g., a key or sequence with or without a data signal) on an interconnect 504 to target 508. A copy of the information 506-1 is also obtained by a tamper detector 510. The target 508 may also send information 506-2 on an interconnect 512 or interconnect 504, while the tamper detector 510 obtaining a copy of 506-2. The tamper detector 510 also obtains the information as received by the receiving units, i.e., the initiator 502 and target 508, as shown by arrows 514 and 516. For example, the tamper detector receives 506-1-R and 506-2-R. If there is an attempt to spoof or read the signals, it is likely that the 506-1-R and/or 506-2-R is different. The tamper detector can compare 506-1 to 506-1-R and 506-2 to 506-2-R to determine whether the differences (shown by arrows 520 and 522) warrant tamper alerts, notifications, and/or corrective actions in response. Accordingly, an access unit 518 can send a new access control rule R1 or R2 to the initiator 502 and/or target 508. In certain implementations, the access control rules may be assigned different priority values. The access control unit may be configured to interpret access control rules associated with higher priority levels as overriding access control rules associated with lower priority levels.

Figure 6:
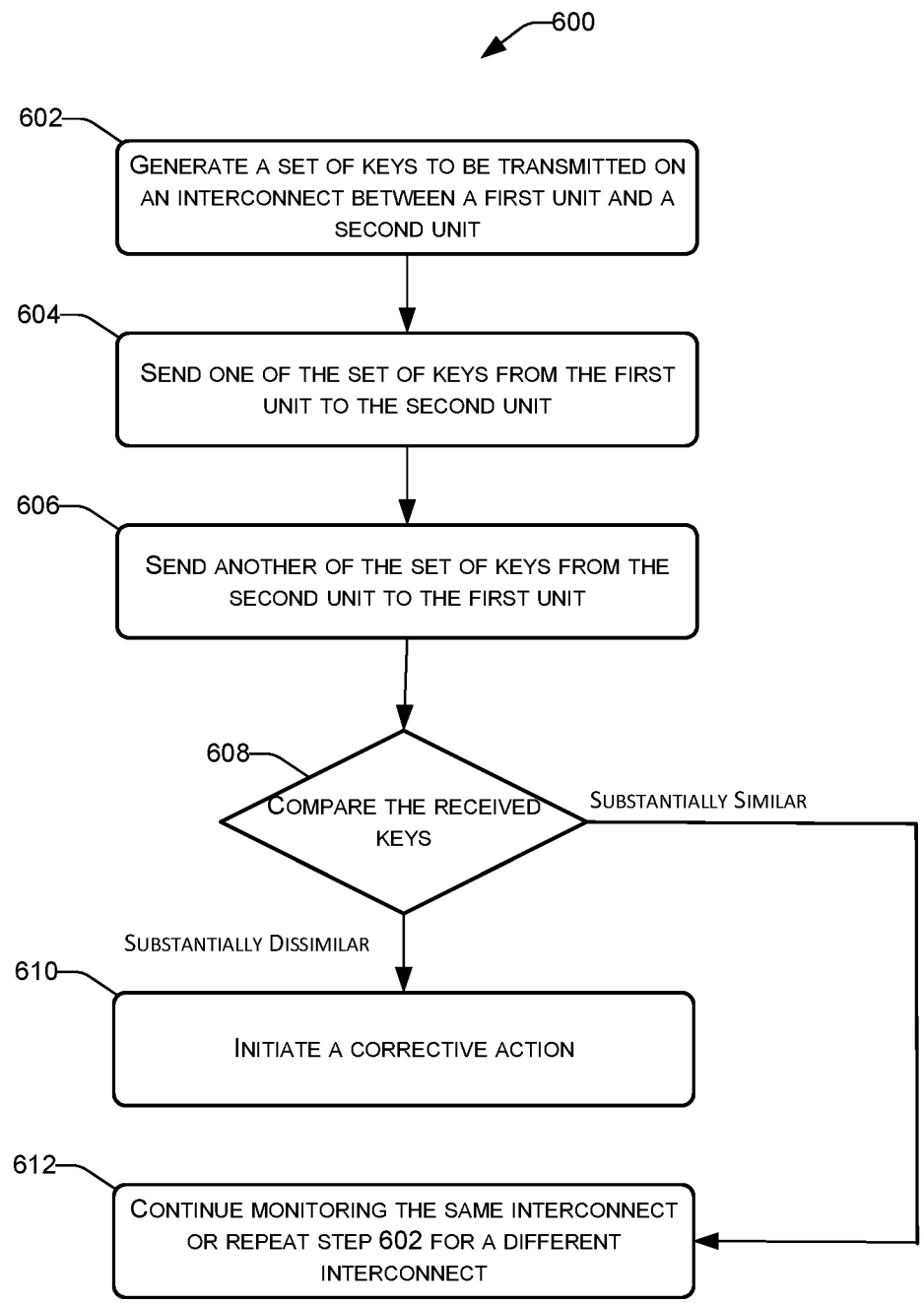
FIG. 6 is an exemplary diagram of a process flow for key generation and tamper event detection in accordance with some embodiments of the present disclosure.

In view of the structures and devices described supra, methods that can be implemented in accordance with the disclosed subject matter will be better appreciated with reference to the flowcharts of FIG. 6 While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 6 depicts exemplary steps for implementing tamper detection or tamper monitoring mechanisms for device security in a device in accordance with some embodiments of the present disclosure. At step 602, one or more sources may generate unique information, such as keys, sequences, nonces, one-time-pads, etc., to pass along a set of interconnects, such as conductive traces of a tamper mesh. In some embodiments, multiple sources may be used to generate a single key or multiple keys, based on multiple levels of key generation steps. Specific device characteristics may be also be used for for generation of customized keys, and for various other purposes such as providing digital signatures, identifying tamper attempts, and various other data and processing operations as described herein.

As described herein, a key generator may generate a pair of keys, such as first key and second key, where the first key and the second key may be related to each other and/or embedded in a data or clock signal. Further, the second key may be a value of the first key, where the first key may be an unencrypted over the trace but the second key may be an encrypted value of the key. In some embodiments, the pair of interconnects on which to transmit the keys, for example in one embodiment, the interconnects can be selected based on which traces are more likely to be tampered with or are historically more probe to tampering and so on. Once the keys are generated, processing may continue to step 604.

At step 604, a first key is sent in a first direction or on an interconnect between a first unit and a second unit. The key travels over the interconnect either by itself or as part of a data or clock stream. In some implementations, a layer of encryption may be applied to separate the key from the data/clock signal difficult. At step 606, a second key is sent in a second direction or on an interconnect between the second unit and the first unit, where the interconnect may be the same as the one described in step 604 or a separate interconnect.

At step 608, information obtained on the other end of the interconnect is then compared. For example, the keys being transmitted on the interconnects in steps 602 and 604 may have changed, for example, as a result of a tamper event. For example, it may be determined whether the information (e.g., a key) has been successfully transmitted, where the success, for example, is determined based on whether the key travels substantially unchanged. For this, the keys are compared to a threshold and further to an error correction mechanism. For example, a low-resilience error correction (e.g., requiring higher-difference key data between the key sent and received) may be utilized for critical security operations while a higher-resilience error correction (e.g., requiring lower-difference key data) may be utilized for less critical operations. As a further example, a first error correcting code (ECC) may be capable of correcting up to a first threshold number of errors in the received data, and a second ECC may be capable of correcting up to a second threshold number of errors in the received data. If the first ECC is able to successfully correct each error in the received data, then a first set (one or more) secure operations may be permitted. If the second ECC is able to successfully correct each error in the received data, then a second set (one or more) secure operations may be permitted. In some embodiments, a tamper event may result in a change to the received data acquired from the source (i.e., initiator or target) such that a given ECC is unable to successfully correct each error in the received data. The inability of the ECC to successfully correct at least some of the errors in the received data may be used to identify an occurrence of the tamper event. In other examles, other techniques for performing error correction and using the results of the error correction processes may be used. Furthermore, another set of keys, similar to the step in 602, may be performed to confirm that a tamper event has happened.

If both pieces of information, that is information obtained from the initiator and the target, is substantially similar, processing may continue to step 612 where the monitoring is paused for the identified interconnects as they may be deemed tamper-proof for a certain period of time or indefinitely, while another set of interconnects may be monitored using step 602 and so on. If both pieces of information, that is information obtained from the initiator and the target, is substantially dissimilar, such as over or below a threshold or ECC, processing may continue to step 610.

At step 610 it may be determined whether there is a possible remedy for the device based on dissimilar information, such as applying alternative ECC operations, accessing an alternative source, lowering a security or other operational tier, performing additional attempts with the same source and ECC, or other similar operations as described herein. If a possible remedy is available, processing may return to step 602 based on any revised parameters, if any. If a possible remedy is not available, one or more corrective actions may be applied to the device. In some embodiments, a choice of corrective action may be based on which of sources and/or interconnects are exhibiting tamper-like behavior in step 608. Different corrective actions of different severities may be applied based on such tiered operations, as well on as other available data such as number of failed attempts, operational or environmental data astamper detection device iated with the device, the circumstances (e.g., transaction processing operations, location, time of day, etc.) of the device, and information and commands provide by other devices such as a server or merchant device. Corrective action can include various operations as described herein, including but not limited to disabling access to the sources (e.g., access control units, initiator, target, etc.), destroying the sources, disabling access to communication interfaces, providing error messages or notifications, providing error displays, providing counter-measures to interfere with tamper devices, disabling access to cryptographic processes, destroying memory devices or erasing critical information described therein, requesting a firmware update, providing detailed log data to a remote server, and other similar operations. Once corrective action has been taken at step 610, the processing of FIG. 6 may end.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method for a device to engage in secure operations, the method comprising:
generating, by a key generator of the device, a set of keys;
transmitting, in a first direction and over a conductive trace, a first key of the set of keys, wherein the conductive trace connects a primary secure unit of the device to a secondary secure unit of the device and the first direction corresponds to the first key being transmitted from the primary secure unit to the secondary secure unit;
transmitting, in a second direction and over the conductive trace, a second key of the set of keys, wherein the second direction corresponds to the second key being transmitted from the secondary secure unit to the primary secure unit;
receiving, by a key comparator associated with the key generator, at the primary secure unit a version of the second key and at the secondary secure unit a version of the first key;
determining, by the key comparator, whether received versions of the first key or the second key are different from the first key and the second key as transmitted respectively to the secondary secure unit and the primary secure unit; and
if the first key, as transmitted to the secondary secure unit, is different from a received version of the first key, or if the second key, as transmitted to the secondary secure unit, is different from a received version of the second key, applying a corrective action corresponding to a tamper attempt.

2. The method of claim 1, further comprising:
determining a respective address corresponding to the primary secure unit and the secondary secure unit; and
in response to detection of the tamper attempt, dynamically changing the respective address of the primary secure unit and the secondary secure unit.

3. The method of claim 1, further comprising:
correcting, at an error correction code circuitry of the device, the received version of the first key or the received version of the second key based on an error correction code, wherein the error correction code is capable of correcting up to a threshold number of errors in received keys as compared to transmitted keys; and
identifying, by the device, the tamper attempt when the error correction code is not capable of correcting errors in received keys.

4. The method of claim 1, further comprising:
determining, using a machine learning model, the conductive trace from amongst a plurality of conductive traces to monitor for a potential tamper attempt.

5. A method for a device to engage in secure operations, the method comprising:
generating, by a secure unit, information selected from one of keys, nonces, one-time-pads, and sequences;
sending, over a conductive path connecting a primary unit to a secondary unit, the generated information from the primary unit to the secondary unit and then from the secondary unit to the primary unit;
detecting, by the secure unit, a version of the information at a selected point on the conductive path to be different from the generated information; and
applying a corrective action corresponding to a tamper attempt, wherein the tamper attempt corresponds to the detecting.

6. The method of claim 5, further comprising:
determining a respective address corresponding to the primary unit and the secondary unit; and
in response to detection of the tamper attempt, dynamically changing the respective address of the primary unit and the secondary unit.

7. The method of claim 5, further comprising:
correcting, at an error correction code circuitry of the device, the version of the information at the selected point on the conductive path based on an error correction code; and
identifying, by the device, the tamper attempt when the error correction code is not capable of correcting errors.

8. The method of claim 5, further comprising:
determining, using a machine learning model, the conductive trace from amongst a plurality of conductive traces to monitor for a potential tamper attempt, wherein the determining is based on at least one hardware or software unit connected to the conductive trace.

9. The method of claim 5, further comprising appending the generated information to at least one of a data signal or a clock signal.

10. The method of claim 5, wherein the conductive path is based on I2C protocol.

11. The method of claim 5, wherein the conductive path is connected between a first secure unit and a second secure unit, wherein at least the first secure unit or the second secure unit are prone to tampering.

12. The method of claim 5, wherein the generated information is generated by a cryptographic unit, and wherein the generated information is encrypted.

13. The method of claim 5, further comprising:
determining a risk associated with the tamper attempt; and
configuring the corrective action in accordance with the risk, wherein the secure operations are processed.

14. The method of claim 5, wherein the generated information sent is a challenge question and the information detected is a response to the challenge question, wherein both the challenge question and acceptable responses to the challenge question are at least one of generated or stored by the secure unit.

15. A device to engage in secure operations, the device comprising:
one or more processors;
one or more computer-readable media storing instructions that, when executed by the one or more processors, cause the device to perform operations comprising:
generating, by a secure unit of the device, information selected from one of keys, nonces, one-time-pads, and sequences;
sending, by the secure unit and over a conductive path between a primary unit and a secondary unit, the generated information from the primary unit to the secondary unit;
sending, by the secure unit and over the conductive path, the generated information from the secondary unit to the primary unit;
detecting, by the secure unit, a version of the information at a selected point on the conductive path to be different from the generated information; and
applying a corrective action corresponding to a tamper attempt, wherein the tamper attempt corresponds to the detecting.

16. The device of claim 15, the operations further comprising:
determining a respective address corresponding to the primary unit and the secondary unit; and
in response to detection of the tamper attempt, dynamically changing the respective address of the primary unit and the secondary unit.

17. The device of claim 15, the operations further comprising correcting the version of the information at the selected point on the conductive path based on an error correction code, wherein the tamper attempt is detected when the error correction code is not capable of correcting errors.

18. The device of claim 15, wherein the conductive path is based on I2C protocol.

19. The device of claim 15, wherein the conductive path is connected between a first secure unit and a second secure unit, wherein at least the first secure unit or the second secure unit are prone to tampering.

20. The device of claim 15, the operations further comprising at least one of generating or storing a challenge question and one or more responses to the challenge question in the secure unit, and wherein the generated information sent is the challenge question and the information detected is a response to the challenge question.

* * * * *